(12) United States Patent
Gandra et al.

(10) Patent No.: US 9,448,663 B2
(45) Date of Patent: Sep. 20, 2016

(54) PARALLEL TOUCH POINT DETECTION USING PROCESSOR GRAPHICS

(71) Applicant: Intel Corporation, Santa Clara, CA (US)

(72) Inventors: Chaitanya R. Gandra, El Dorado Hills, CA (US); Balaji Vembu, Folsom, CA (US); Arvind A. Kumar, Palo Alto, CA (US); Nilesh V. Shah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,427

(22) PCT Filed: Jun. 28, 2013

(86) PCT No.: PCT/US2013/048435
§ 371 (c)(1),
(2) Date: Dec. 26, 2013

(87) PCT Pub. No.: WO2014/209335
PCT Pub. Date: Dec. 31, 2014

(65) Prior Publication Data
US 2016/0098148 A1    Apr. 7, 2016

(51) Int. Cl.
*G06F 3/041* (2006.01)
*G06F 3/0488* (2013.01)
*G06T 1/20* (2006.01)

(52) U.S. Cl.
CPC .......... *G06F 3/0418* (2013.01); *G06F 3/0416* (2013.01); *G06F 3/0488* (2013.01); *G06T 1/20* (2013.01); *G06F 2203/04104* (2013.01)

(58) Field of Classification Search
CPC ............... G06F 3/0416; G06F 3/0417; G06F 2203/04108; G06F 3/0421; G06F 3/0428; G06T 1/20; G06T 15/10; G06T 17/20; G06T 7/004; G06T 7/20; G06T 2207/30241; G06T 7/2053; G06T 2207/10016; H04N 19/139
See application file for complete search history.

(56) References Cited

U.S. PATENT DOCUMENTS 8,482,536 B1 * 7/2013 Young ..................... G06F 3/044
                                                  178/18.03
8,674,962 B2    3/2014 Chiang et al.
(Continued)

FOREIGN PATENT DOCUMENTS

CN    103135832 A    6/2013
KR    1020120094929 A    8/2012

OTHER PUBLICATIONS

International Search Report and Written Opinion received for International Application No. PCT/US2013/048435, mailed Mar. 31, 2014, 10 pages.
(Continued)

*Primary Examiner* — Sanjiv D Patel
(74) *Attorney, Agent, or Firm* — Barnes & Thornburg LLP

(57) ABSTRACT

Technologies for touch point detection include a computing device configured to receive input frames from a touch screen, identify touch point centroids and cluster boundaries, and track touch points. The computing device may group cells of the input frame into blocks. Using a processor graphics, the computing device may dispatch one thread per block to identify local maxima of the input frame and merge centroids within a touch distance threshold. The computing device may dispatch one thread per centroid to detect cluster boundaries. The computing device may dispatch one thread per previously identified touch point to assign an identifier of a previously tracked touch point to a touch point within a tracking distance threshold, remove duplicate identifiers, and assign unassigned identifiers to closest touch points. The computing device may dispatch one thread per block to assign unique identifiers to each unassigned touch point. Other embodiments are described and claimed.

21 Claims, 7 Drawing Sheets

(56) References Cited

U.S. PATENT DOCUMENTS

| | | | |
|---|---|---|---|
| 8,913,018 B2* | 12/2014 | Ben-Shalom | G06F 3/0418 178/18.01 |
| 9,213,052 B2* | 12/2015 | Wilson | G01R 27/26 |
| 2008/0309629 A1* | 12/2008 | Westerman | G06F 3/038 345/173 |
| 2010/0315372 A1* | 12/2010 | Ng | G06F 3/045 345/174 |
| 2012/0113017 A1* | 5/2012 | Benko | G06F 3/0416 345/173 |
| 2012/0120006 A1 | 5/2012 | Liu | |
| 2012/0206380 A1* | 8/2012 | Zhao | G06F 3/04883 345/173 |
| 2012/0218215 A1 | 8/2012 | Kleinert et al. | |
| 2013/0021272 A1* | 1/2013 | Wang | G06F 3/0416 345/173 |
| 2013/0257781 A1 | 10/2013 | Phulwani et al. | |
| 2013/0321303 A1* | 12/2013 | Madanmohan | G06F 3/0416 345/173 |

OTHER PUBLICATIONS

"Touchscreen," Wikipedia, The Free Encyclopedia, retrieved from: <http://en.wikipedia.org/w/index.php?title=Touchscreen&oldid=534323877>, edited Jan. 22, 2013, 10 pages.

"Graphics processing unit," Wikipedia, The Free Encyclopedia, retrieved from: <http://en.wikipedia.org/w/index.php?title=Graphics_processing_unit&oldid=534240100>, edited Jan. 21, 2013, 8 pages.

U.S. Appl. No. 13/724,291, filed Dec. 21, 2012, 29 pages.

* cited by examiner

PARALLEL TOUCH POINT DETECTION USING PROCESSOR GRAPHICS

CROSS REFERENCE TO RELATED APPLICATIONS

This application is a national stage entry under 35 USC §371(b) of International Application No. PCT/US2013/048435, which was filed Jun. 28, 2013.

BACKGROUND

Many current computing devices use a touch screen as the primary mode of input from the user. Touch computing has the capability to provide intuitive and efficient user interaction. Computing devices employing touch interfaces typically detect and interpret multiple simultaneous touch points on the touch screen to recognize touch input gestures and to reject spurious contacts such as the user's palm resting on the screen. Touch tracking and gesture interaction should be fast and fluid, to permit natural human interaction.

Typical algorithms for touch point identification and tracking are highly sequential, iterative, and/or recursive in nature. Computing devices may identify touch points by identifying locations of peak touch intensity, called centroids, and by identifying the extents of the touch point, called cluster boundaries. Computing devices may also track the motion of touch points over time to allow for gesture recognition. For example, a typical algorithm for touch point centroid boundary detection may involve recursive traversal of adjoining cells in an input frame, and may be iterated sequentially for each potential touch point. Also, a typical algorithm for touch point tracking may iterate through all known combinations of predicted touch point locations and detected current touch point locations. Those typical algorithms may not scale well or otherwise respond well to parallel execution.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
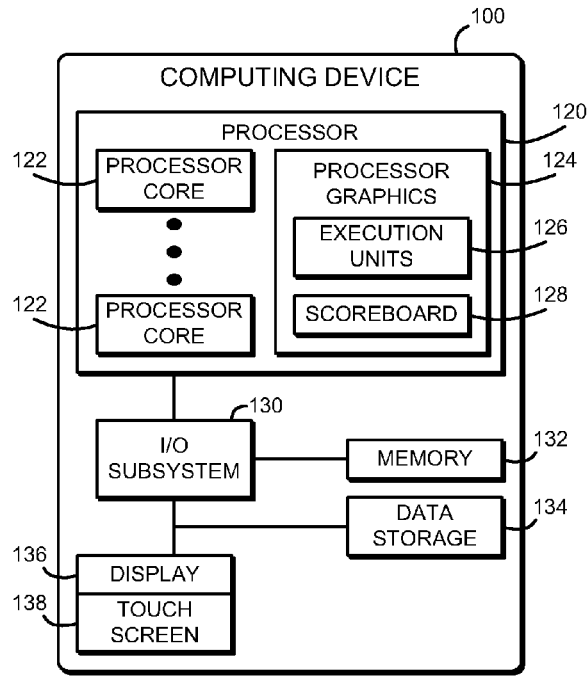
FIG. 1 is a simplified block diagram of at least one embodiment of a computing device for detecting touch points in parallel using processor graphics.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 processes touch input frame data received from a touch screen in parallel using processor graphics. Processing the input frame data may include identifying touch point centroids and cluster boundaries, as well as tracking the motion of touch points across input frames. Processing input frame data in parallel on the processor graphics may improve performance, reduce power consumption, or any combination thereof. Additionally, the processing algorithms disclosed herein may have more stable execution times for differing numbers of touch inputs and therefore may improve touch screen responsiveness and predictability.

The computing device 100 may be embodied as any type of computing device capable of processing touch input frames and otherwise performing the functions described herein. For example, the computing device 100 may be embodied as, without limitation, a computer, a smart phone, a tablet computer, a laptop computer, a notebook computer, a mobile computing device, a desktop computer, a work station, a cellular telephone, a handset, a messaging device, a vehicle telematics device, a network appliance, a web appliance, a distributed computing system, a multiprocessor system, a processor-based system, a consumer electronic device, a digital television device, and/or any other computing device configured to process touch point data in parallel. As shown in FIG. 1, the computing device 100 includes a processor 120, an I/O subsystem 130, a memory 132, a data storage 134, a display 136, and a touch screen 138. Of course, the computing device 100 may include other or additional components, such as those commonly found in a tablet computer (e.g., various input/output devices), in other embodiments. Additionally, in some embodiments, one or more of the illustrative components may be incorporated in, or otherwise form a portion of, another component. For example, the memory 132, or portions thereof, may be incorporated in the processor 120 in some embodiments.

The processor 120 may be embodied as any type of processor capable of performing the functions described herein. The processor 120 is illustratively embodied as a multi-core processor having a plurality of processor cores 122. However, the processor 120 may be embodied as a single or multi-core processor(s), digital signal processor, microcontroller, or other processor or processing/controlling circuit. Similarly, the memory 132 may be embodied as any type of volatile or non-volatile memory or data storage capable of performing the functions described herein. In operation, the memory 132 may store various data and software used during operation of the computing device 100 such as operating systems, applications, programs, libraries, and drivers. The memory 132 is communicatively coupled to the processor 120 via the I/O subsystem 130, which may be embodied as circuitry and/or components to facilitate input/output operations with the processor 120, the memory 132, and other components of the computing device 100. For example, the I/O subsystem 130 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 130 may form a portion of a system-on-a-chip (SoC) and be incorporated, along with the processor 120, the memory 132, and other components of the computing device 100, on a single integrated circuit chip.

The processor 120 includes a processor graphics 124. The processor graphics 124 includes graphics and media processing circuitry that may provide accelerated processing and rendering of three-dimensional graphics, two-dimensional graphics, and various video formats. The processor graphics 124 is generally characterized by heavily parallel computing resources and may be embodied as a plurality of execution units 126. In some embodiments, the execution units 126 may include fully programmable execution units or any combination of fixed-function execution units for geometry processing, transform and lighting, rasterization, media decoding, media encoding, and the like.

The processor graphics 124 may be used, along with the processor core(s) 122, to perform general-purpose computing tasks. The computing tasks may be embodied as threads, kernels, or other executable code dispatched by one or more of the processor cores 122 for execution by the processor graphics 124. The tasks are executed, in parallel, by the programmable execution units 126 and/or the fixed-function execution units 126 of the processor graphics 124. The execution units 126 may provide a number of single-instruction-multiple-data (SIMD) instructions, such as SIMD subtract and SIMD add instructions. In some embodiments, the processor graphics 124 may include an instruction scheduler such as a scoreboard 128 that dispatches tasks for execution. In those embodiments, the processor core(s) 122 log data dependencies between the tasks to the scoreboard 128, and the processor graphics 124 uses the scoreboard 128 to dispatch tasks according to the logged data dependencies and available execution resources. General-purpose computing using the processor graphics 124 may be exposed to the user by a parallel programming interface such as compute shaders, DirectCompute, OpenCL™, CUDA™ (also known as Compute Unified Device Architecture), or the like.

In some embodiments, the processor graphics 124 may be included on the same integrated circuit chip as the processor core(s) 122 or as a separate integrated circuit chip included in the same physical package as the processor core(s) 122. In other embodiments, the processor graphics 124 may be included in the I/O subsystem 130, discussed in more detail below. In still other embodiments, the processor graphics 124 may be included on a separate expansion board communicatively coupled to a motherboard of the computing device 100.

The data storage 134 may be embodied as any type of device or devices configured for the short-term or long-term storage of data. For example, the data storage 134 may include any one or more memory devices and circuits, memory cards, hard disk drives, solid-state drives, or other data storage devices. In some embodiments, the data storage 134 may store input frame data or touch point tracking data, as described further below.

The display 136 of the computing device 100 may be embodied as any type of display capable of displaying digital information such as a liquid crystal display (LCD), a light emitting diode (LED), a plasma display, a cathode ray tube (CRT), or other type of display device. The touch screen 138 may be embodied as any type of touch screen capable of generating input data in response to being touched by the user of the computing device 100. The touch screen 138 may be embodied as a resistive touch screen, a capacitive touch screen, or a camera-based touch screen. The touch screen 138 is responsive to multiple simultaneous touch points.

Figure 2:
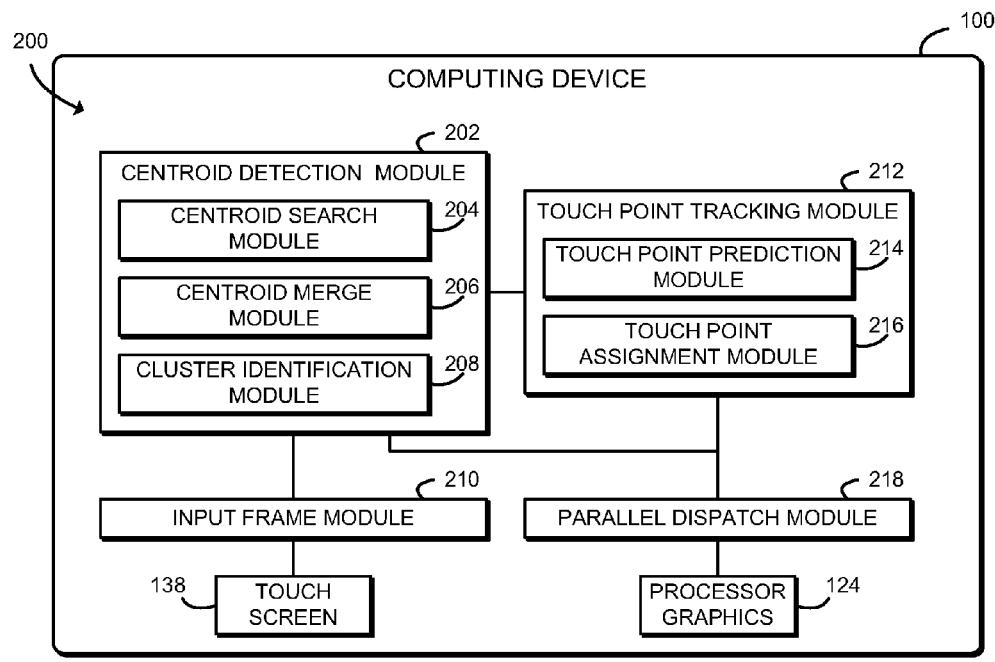
FIG. 2 is a simplified block diagram of at least one embodiment of an environment of the computing device of FIG. 1.

Referring now to FIG. 2, in an embodiment, the computing device 100 establishes an environment 200 during operation. The illustrative environment 200 includes a centroid detection module 202, an input frame module 210, a touch point tracking module 212, and a parallel dispatch module 218. The various modules and sub-environments of the environment 200 may be embodied as hardware, firmware, software, or a combination thereof.

The input frame module 210 is configured to receive data from the touch screen 138 and format the input data as a series of input frames. Each input frame may be embodied as an array of input cells, each containing a touch data value representing the touch value sensed at a particular position on the touch screen 138. The input frame module 210 continually produces updated input frames, to enable high-resolution touch tracking.

The centroid detection module 202 is configured to search input frames received from the input frame module 210 for centroids; that is, points on the touch screen 138 roughly corresponding to the center of each touch point. The centroid detection module 202 is further configured to merge neighboring centroids into a single centroid, and to detect the boundaries of clusters of input cells surrounding each centroid. The cluster boundary represents the extent of each touch point. In some embodiments, those functions may be performed by sub-modules, for example by a centroid search module 204, a centroid merge module 206, or a cluster identification module 208.

The touch point tracking module 212 is configured to identify and track particular touch points across input frames over time. In particular, the touch point tracking module 212 is configured to predict locations of previously-tracked touch points, and then assign identifiers from the previously tracked touch points to touch points detected in the current input frame by the centroid detection module 202. The touch point tracking module 212 may also assign unique identifiers to touch points in the current input frame not previously tracked. In some embodiments, the touch point tracking module 212 may process raw input frame data from the input frame module 210. In some embodiments, those functions may be performed by sub-modules, for example by a touch point prediction module 214 or a touch point assignment module 216.

The parallel dispatch module 218 is configured to schedule and execute computing tasks in parallel using the processor graphics 124. That is, the parallel dispatch module 218 dispatches tasks to be executed contemporaneously using multiple execution units 126 of the processor graphics 124. The parallel dispatch module 218 may log data dependencies with the scoreboard 128 of the processor graphics 124 to control the order of execution of the tasks. Both the centroid detection module 202 and the touch point tracking module 212 may use the parallel dispatch module 218 to execute portions of their respective algorithms in parallel. Additionally, both the centroid detection module 202 and the touch point tracking module 212 may execute portions of their respective algorithms using SIMD instructions of the processor graphics 124. For example, the centroid detection module 202 may search for centroids, merge centroids, and identify clusters in parallel using the processor graphics 124. Similarly, the touch point tracking module 212 may assign identifiers from predicted touch points and may generate new unique touch points in parallel using the processor graphics 124.

Figure 3:
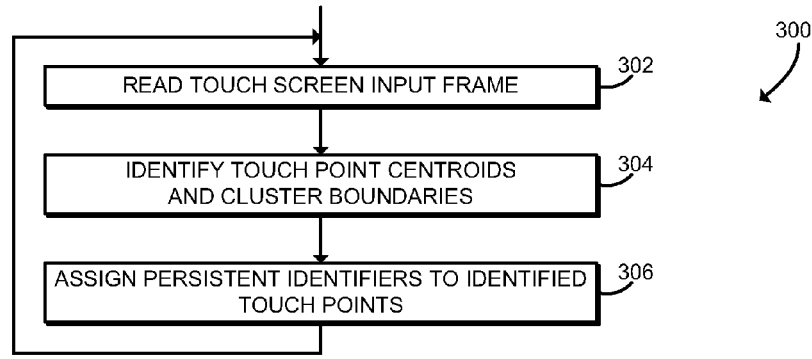
FIG. 3 is a simplified flow diagram of at least one embodiment of a method for detecting touch points, which may be executed by the computing device of FIGS. 1 and 2.
Figure 4:
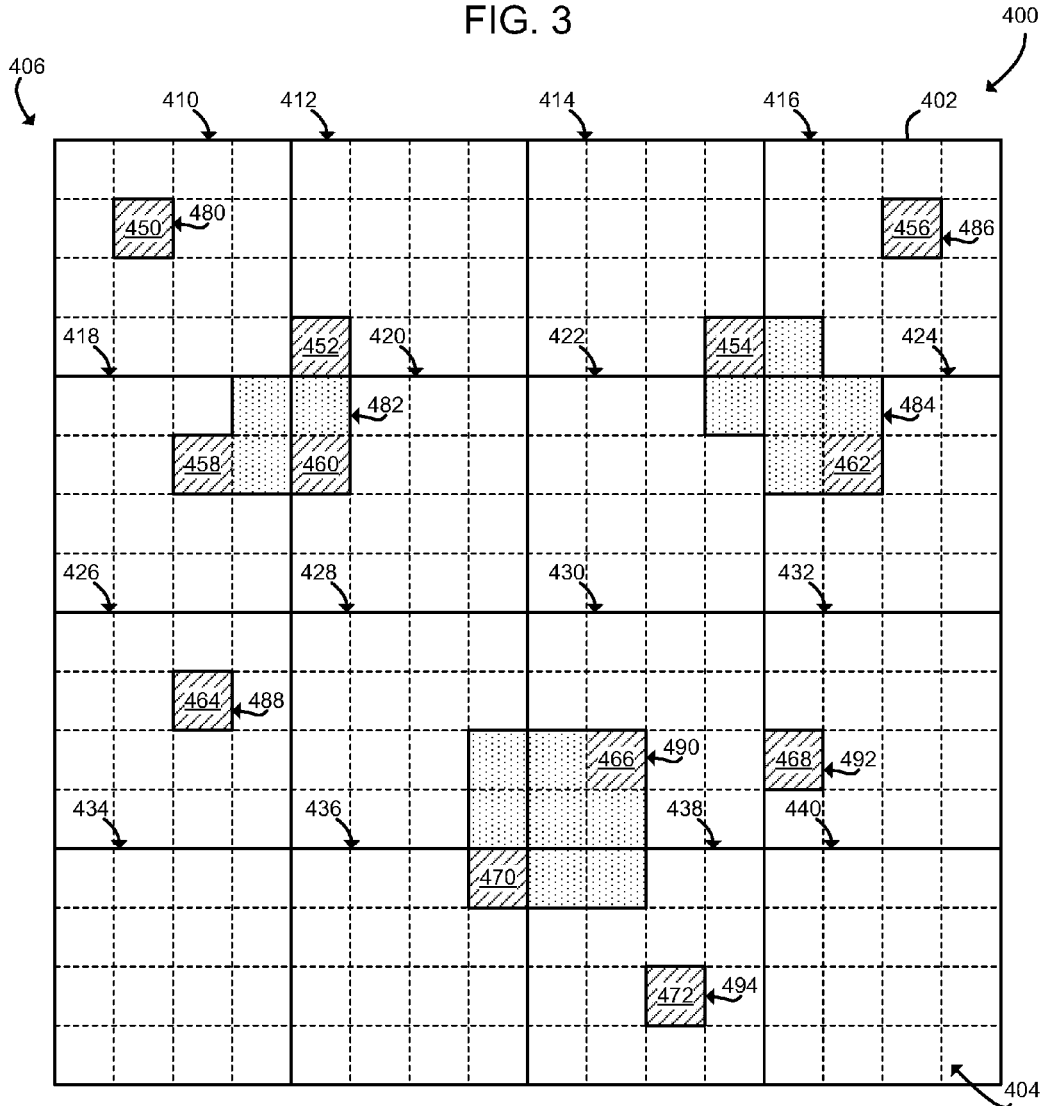
FIG. 4 is a schematic diagram of an input data frame that may be produced by a touch screen of the computing device of FIGS. 1 and 2.

Referring now to FIG. 3, in use, the computing device 100 may execute a method 300 for touch point processing. The method 300 begins with block 302, in which the computing device 100 receives an input frame from the touch screen 138. As described above, the input frame includes an array of values representing touch point intensities sensed by the touch screen 138 during a short sample period. For example, an illustrative input frame 402 is shown in FIG. 4. The input frame 402 is illustrated as a square array of cells 404. Each of the cells 404 includes a touch data value sensed on a region of the touch screen 138. Each touch data value corresponds to the touch intensity sensed by the touch screen 138 on that region, for example, the capacitance of the user's finger against the touch screen 138. The touch data values may be embodied as sixteen-bit integer values, or any digital value wide enough to contain the range of intensity values sensed by the touch screen 138.

Referring back to FIG. 3, after receiving the input frame, in block 304 the computing device 100 processes the input frame to identify touch point centroids and cluster boundaries. Clusters may be embodied as groups of contiguous cells of the input frame associated with a single touch point. Centroids may be embodied as cells of the input frame containing the peak of touch intensity for a cluster. Each cluster and associated centroid represents a potential touch point on the touch screen 138. The computing device 100 may analyze the centroid and cluster data to accept or reject potential touch points; for example, the computing device 100 may distinguish fingertip and palm touches based on the size and/or shape of the cluster boundary, accept centroids corresponding to fingertip touches, and reject centroids corresponding to palm touches. The functionality of block 304 is further described below in connection with FIGS. 5-7.

In block 306, after identifying touch points from the raw input frame, the computing device 100 assigns persistent identifiers to each identified touch point. The persistent identifiers track the movement of touch points from frame to frame. These persistent identifiers may be used by the computing device 100 to assist in processing gestural interactions or for other user interactions. The functionality of block 306 is further described below in connection with FIGS. 8-11. After assigning persistent identifiers, the method 300 loops back to block 302 to receive another input frame.

Figure 5:
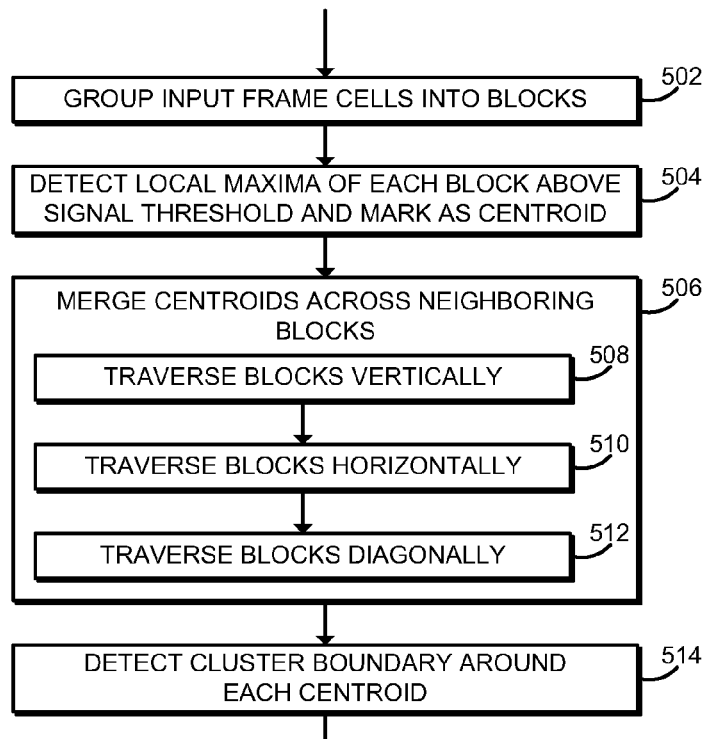
FIG. 5 is a simplified flow diagram of at least one embodiment of a method for detecting touch point centroids and clusters, which may be executed by the computing device of FIGS. 1 and 2.

Referring now to FIG. 5, in use, the computing device 100 may execute the method 500 for identification of touch point centroids and cluster boundaries. The method 500 begins with block 502, in which the computing device 100 groups the cells of the input frame into a number of square blocks. For example, referring to FIG. 4, the input frame 402 includes 256 input cells 404 arranged in a square array. The input cells 404 are grouped into sixteen four-by-four cell blocks 406. In other embodiments not illustrated, the input cells 404 may be grouped into three-by-three cell blocks. And, of course, the input frame 402 may include any number of input cells 404.

Referring back to FIG. 5, in block 504, the computing device 100 detects, for each of the blocks 406, those cells including a local maxima above a signal threshold. In other words, for each of the blocks 406, the computing device 100 searches for the cell within the block having the largest touch data value that is also above the signal threshold. Touch data values below the signal threshold represent noise or other spurious signals detected by the touch screen 138 and are rejected. Each of the identified local maxima is provisionally marked as a centroid. For example, as illustrated in FIG. 4, the shaded cells 450 through 472 represent local maxima detected in each block. For example, block 410 includes a local maxima at cell 450. Each block may have at most one local maximum, and some blocks, for example blocks 422, 428, 434, 440, may not include any identified local maximum. In some embodiments, the computing device 100 may search each of the blocks 406 in a separate search task, and each of these tasks may be dispatched to the processor graphics 124 for execution in parallel.

After identifying centroids, in block 506, the computing device 100 merges centroids across neighboring blocks. Each of the centroids is identified in block 504 using data from a single block 406; however, centroids identified on either side of a block boundary may be part of the same touch point. To eliminate such erroneous centroids, the computing device 100 traverses the blocks 406 to find touch points within a touch distance threshold from each other. The touch distance threshold represents the minimum number of input frame cells between unique touch points, which may be device or implementation dependent. In some embodiments the touch distance threshold may be configured to approximate the size of a human finger. For example, given a fifteen-inch touch screen 138 using a 64 by 32 cell input frame, the touch distance threshold may be two cells. Centroids within the touch distance threshold are merged by marking only the cell with the larger touch data value as the centroid. In block 508, the computing device 100 traverses the blocks 406 vertically; in block 510, the computing device 100 traverses the blocks 406 horizontally; and in block 512 the computing device 100 traverses the blocks 406 diagonally. In some embodiments, the computing device 100 may traverse each of the blocks 406 in a separate merge task, and each of these tasks may be dispatched to the processor graphics 124 for execution in parallel. One method for merging centroids is described further in connection with FIG. 6, below.

After merging the centroids, in block 514 the computing device 100 detects the cluster boundary around each centroid. The detected cluster boundary represents the extent of the detected touch point. For example, referring to FIG. 4, the solid boundaries 480 through 492 represent cluster boundaries, and the shaded cells within the cluster boundary are included in the cluster. Each cluster may include a single cell, for example clusters 480, 486, 488, 492, 494, or may include multiple cells, for example clusters 482, 484, 490. In some embodiments, the computing device 100 may detect cluster boundaries around each centroid in a separate detection task, and each of these tasks may be dispatched to the processor graphics 124 for execution in parallel. One method for detecting cluster boundaries is described further in connection with FIG. 7, below. After detecting cluster boundaries, the method 500 returns, allowing the computing device 100 to continue processing the detected touch points.

Figure 6:
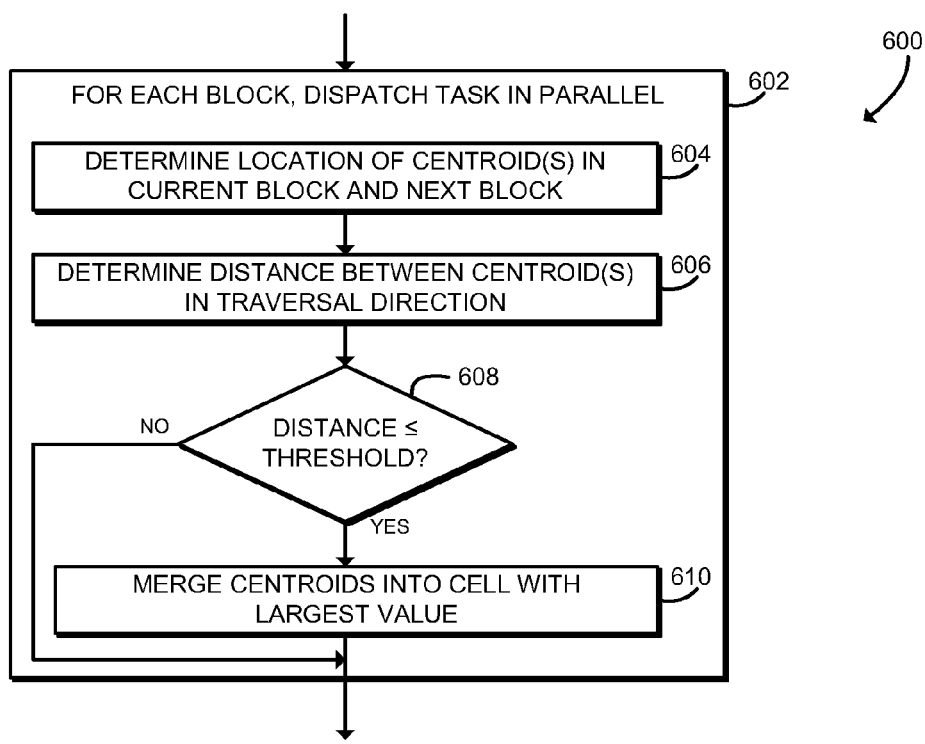
FIG. 6 is a simplified flow diagram of at least one embodiment of a method for traversing input frames in parallel using processor graphics, which may be executed by the computing device of FIGS. 1 and 2.

Referring now to FIG. 6, in use, the computing device 100 may execute a method 600 for merging centroids across neighboring blocks. The method 600 begins with block 602, in which the computing device 100 dispatches a task for each of the blocks 406 in parallel on the processor graphics 124. To control the order of traversal, the computing device 100 may set data dependencies among the tasks using the scoreboard 128 of the processor graphics 124. For example, referring to FIG. 4, for a vertical traversal, the computing device 100 may set block 418 to depend on block 410, block 420 to depend on block 412, and so on such that the tasks will execute in vertical stripes across the input frame 402. Similarly, for a horizontal traversal, the computing device 100 may set block 412 to depend on block 410, block 420 to depend on block 418, and so on such that the tasks will execute in horizontal stripes across the input frame 402. For a diagonal traversal, instead of dispatching a single task per block 406, the computing device may dispatch one task per group of four blocks, the tasks collectively covering the input frame 402. For example, the first task may include blocks 410, 412, 418, 420, and the second task may include blocks 412, 414, 420, 422. The computing device 100 may set dependencies between those tasks to process left-to-right, top-to-bottom, or any consistent order.

For each of the tasks dispatched in block 602, in block 604 the computing device 100 determines the location of any centroids in the current block and in the next block in traversal order. For example, referring to FIG. 4, when traversing vertically for block 410, the computing device 100 may determine the location of centroid 450 in block 410 and the location of centroid 458 in block 418, the next block in traversal order. As another example, when traversing horizontally for block 410, the computing device 100 may determine the location of centroid 450 and centroid 452 of block 412. As a third example, when traversing diagonally, the computing device 100 may determine the location of centroid 450 of block 410 and centroid 460 of block 420. The location of each centroid may be determined as a pair of coordinates corresponding to the input cell 404 containing the centroid. Of course, some blocks may not include any identified centroids, for example, blocks 422, 428, 434, 440.

In block 606, the computing device 100 determines the distance between the centroids identified in block 604 in the traversal direction. The distance between centroids may be measured in terms of input cells 404 separating the centroids. The distance may be measured only for centroids that are aligned in the traversal direction (e.g., vertically, horizontally, or diagonally). For example, referring to FIG. 4, when traversing vertically in block 412, cells 452, 460 have a distance of two input cells between them in the vertical direction, whereas in block 418 cells 458, 464 have a distance of four input cells between them. When traversing horizontally in block 418, cells 458, 460 have a distance of two input cells between them, whereas in block 430 cells 466, 468 have a distance of three input cells between them. When traversing diagonally, in block 414, cells 454, 462 have a distance of two input cells between them, whereas in block 420 cells 460, 466 have a distance of five input cells between them.

Referring back to FIG. 6, in block 608, the computing device 100 determines whether the distance in the traversal direction between the centroids is less than or equal to the touch threshold distance. As described above, the distance threshold represents the minimum number of input frame cells between unique touch points. In some embodiments, the touch distance threshold may be two input cells. If the distance is greater than the threshold, the method 600 returns without merging any centroid and is completed for the current block. Additionally, where less than two centroids exist in the current block and the next block, the method 600 returns and is completed for the current block. Further, where centroids of the current block and the next block are not aligned in the traversal direction, the method 600 returns and is completed for the current block. If the distance is less than or equal to the touch distance threshold, the method 600 advances to block 610.

In block 610, the computing device 100 merges the two centroids into the input cell 404 having the larger touch data value. After merging, the input frame cell containing the larger touch data value remains marked as a centroid, and the other input frame cell is no longer marked as a centroid. For example, when traversing vertically in block 412, the touch data values of cells 452, 460 are compared, and the centroid may be merged into cell 460, assuming that cell 460 has the larger touch data value. Centroids may be merged repeatedly in successive traversal directions. For example, when traversing horizontally in block 418, cells 458, 460 may be merged into cell 460, assuming that cell 460 again has the larger touch data. As another example, when traversing diagonally in block 414, cells 454, 462 may be merged. After merging the centroids, the method 600 returns, and is completed for the current block. Thus, after merging in all traversal directions, any cluster straddling block boundaries includes a single marked centroid. For example, after merging in all traversal directions, the input cell 460 may be the only marked centroid within the cluster boundary 482.

Figure 7:
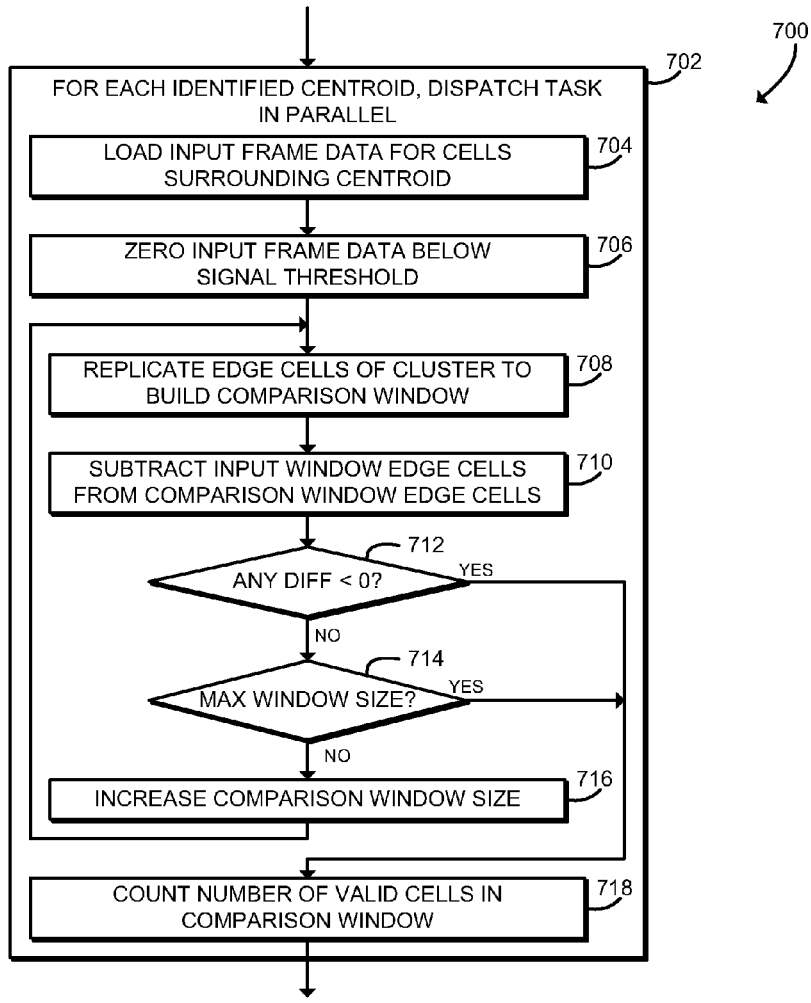
FIG. 7 is a simplified flow diagram of at least one embodiment of a method for identifying touch point cluster boundaries in parallel using processor graphics, which may be executed by the computing device of FIGS. 1 and 2.

Referring now to FIG. 7, in use, the computing device 100 may execute a method 700 for identifying cluster boundaries after centroids have been marked and merged. The method 700 begins with block 702, in which the computing device 100 dispatches a task for each of the marked centroids in parallel on the processor graphics 124. For each of the tasks dispatched in block 702, in block 704, the computing device 100 loads input frame data for cells surrounding the centroid. The number of cells loaded depends on allowed finger or palm sizes. In some embodiments, the computing device 100 may load a sixteen-by-sixteen square block of cells roughly centered on the centroid.

In block 706, the computing device 100 zeros input cells having a touch data value below the signal threshold. That is, the computing device 100 sets the value of such cells to zero. Zeroing input cells below the input threshold may improve detection performance.

In block 708, the computing device 100 replicates edge cells of the cluster to build a comparison window. In the first iteration, the cluster includes only the cell previously marked as a centroid. The computing device 100 defines an input window surrounding the cluster. For example, in the first iteration, the input window may be embodied as a three-by-three cell square window surrounding the centroid. In a later iteration, the input window may be embodied as a five-by-five cell square window surrounding the cluster. Although the illustrative embodiment uses square windows, other embodiments may use variable sized windows such as a three-by-five window, a five-by-three window, or the like. Next, the computing device 100 creates a comparison window of the same size as the input window. Each of the edge cells of the cluster is copied into a neighboring edge cell of the comparison window in a direction away from the centroid. Thus, corner cells of the input window are extended in three directions: diagonally, horizontally, and vertically. As described above, in the first iteration, the centroid value is extended to the edges of the comparison window.

Figure 8:
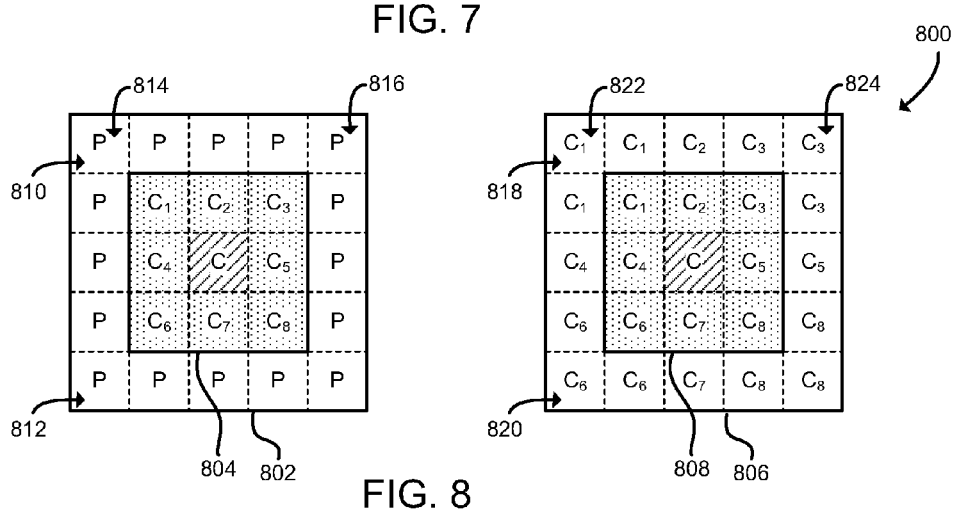
FIG. 8 is a schematic diagram of an input window and a comparison window that may be used during execution of the method of FIG. 7.

Referring now to FIG. 8, diagram 800 illustrates one embodiment of an input window and a comparison window. Array 802 illustrates the input window. Cell C includes an identified centroid. Cluster boundary 804 is a three-by-three cell square including cells $C_1$ through $C_8$ that have been previously identified as members of the cluster. Input window 802 includes sixteen edge cells P. Array 806 illustrates the comparison window. Comparison window 806 may be embodied as a separate array stored in memory. Cluster boundary 808 corresponds to the cluster boundary 804 and includes copies of cells $C_1$ through $C_8$. The edge cells of comparison window 806 include values copied from within the cluster boundary 808. As shown, the value of cell $C_1$ is copied into three corner cells, the value of cell $C_2$ is copied into a single edge cell, the value of cell $C_3$ is copied into three corner cells, and so on.

Referring back to FIG. 7, in block 710, the computing device 100 subtracts the value of input frame edge cells from corresponding comparison window edge cells. In some embodiments, the computing device 100 may perform that subtraction on all four edges of the windows using single-instruction-multiple-data (SIMD) instructions of the computing device 100. For example, the values of each edge may be packed into a vector, and the computing device 100 may perform the subtraction of each edge using a single packed vector subtraction instruction. Of course, in other embodiments, the computing device 100 may perform a discrete subtraction for each cell. For example, referring to FIG. 8, the input window 802 includes top edge 810, bottom edge 812, left edge 814, and right edge 816. The comparison window 806 includes top edge 818, bottom edge 820, left edge 822, and right edge 824. To calculate the differences for the top edge, the computing device 100 may pack the values of the top edge 810 and the top edge 818 into vectors, and subtract the vector for the top edge 810 from the vector for the top edge 818. The computing device 100 may perform a similar calculation for other edges.

Referring back to FIG. 7, in block 712, the computing device 100 determines whether any of the differences resulting from the subtractions calculated in block 710 are less than zero. If so, that means that for at least one of the edge cells, the input frame value is greater than the value of a neighboring cell within the cluster. For the first iteration, that means that one of the cells surrounding the centroid is greater than the centroid. In that situation, the slope of the touch data values is non-negative—that is, the touch value data has started to increase. Thus, in that situation, the centroid boundary has been found. If any of the differences is less than zero, the method 700 branches to block 718, described below. If none of the differences is less than zero, the method 700 advances to block 714.

In block 714, the computing device 100 determines whether the comparison window size has reached a maximum window size. The maximum window size may be defined based on, for example, the size of the input frame data block loaded in block 704. For example, the maximum window size may be fifteen cells by fifteen cells, the largest window size possible within a sixteen-cell square block of input frame data. If the maximum window size has been reached, the method 700 branches to block 718, described below. If the maximum window size has not been reached, the method 700 advances to block 716.

In block 716, the computing device 100 increases the comparison window size. Because none of the differences calculated in block 710 were below zero, every cell of the current comparison window is included within the centroid boundary. Therefore, the comparison window size and the related input window size may be increased to continue searching for the boundary. After increasing the comparison window size, the method 700 loops back to block 708 to build another comparison window.

Referring back to block 712, if any difference is less than zero, the method 700 branches to block 718. Additionally, referring back to block 714, if the maximum window size has been reached, the method 700 branches to block 718. In block 718, the computing device 100 counts the number of valid cells in the comparison window. Valid cells are those for which the difference calculated in block 710 is not less than zero. In some embodiments, the computing device 100 may identify all non-zero cells within the input window as valid cells, because cells below the signal threshold were zeroed in block 706. The computing device 100 may count the number of valid cells using a SIMD sum instruction. The number of valid cells may be used by the computing device 100 to determine the cluster boundary; that is, the size of the touch point surrounding the centroid.

Figure 9:
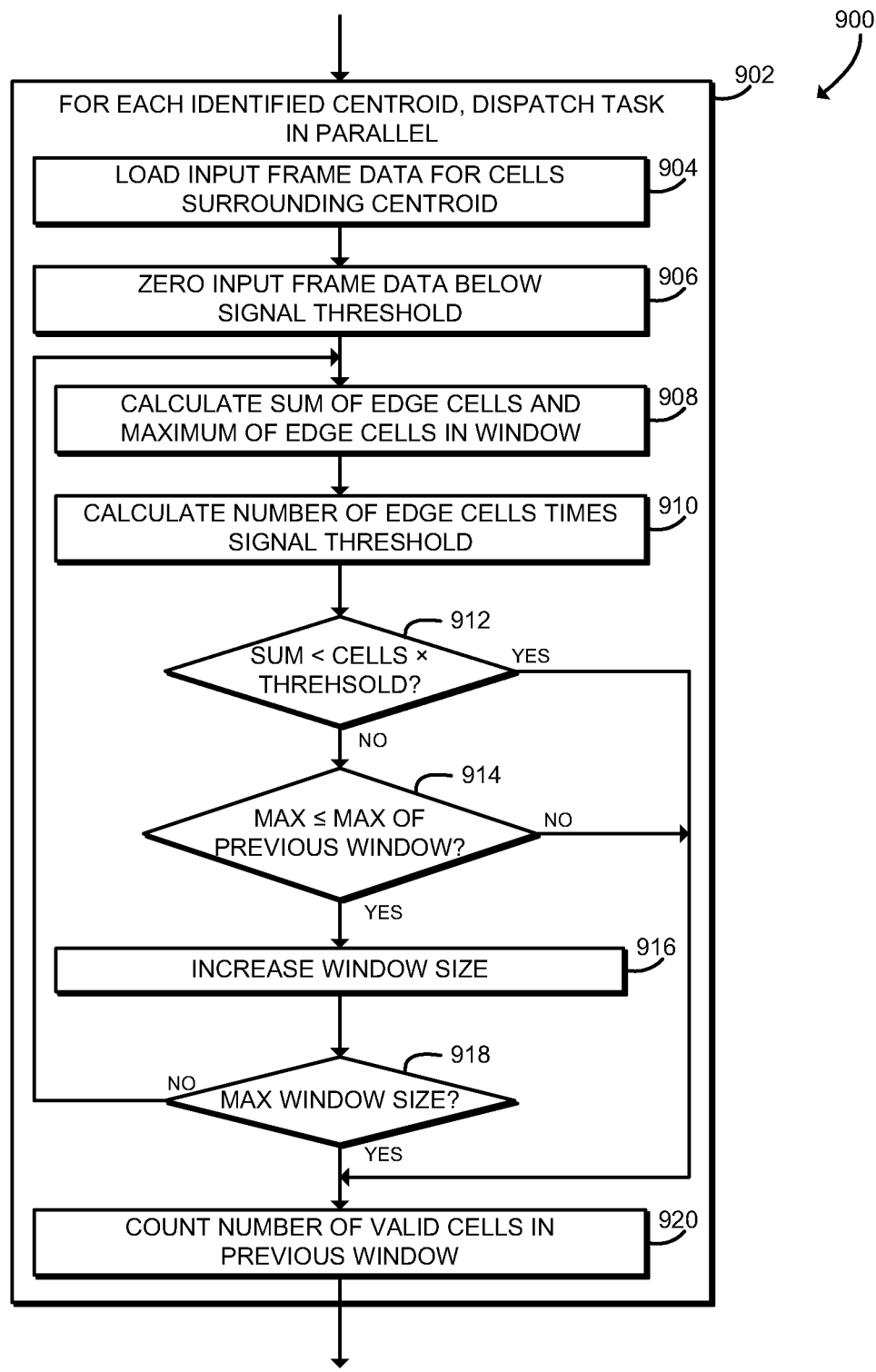
FIG. 9 is a simplified flow diagram of at least one embodiment of another method for identifying touch point cluster boundaries in parallel using processor graphics, which may be executed by the computing device of FIGS. 1 and 2.

Referring now to FIG. 9, in use, the computing device 100 may execute a method 900 for identifying cluster boundaries after centroids have been marked and merged. The method 900 may be appropriate for use with a touch screen 138 that tends to produce noisy input frames. The method 900 begins with block 902, in which the computing device 100 dispatches a task for each of the marked centroids in parallel on the processor graphics 124. For each of the tasks dispatched in block 902, in block 904, the computing device 100 loads input frame data for cells surrounding the centroid. The number of cells loaded depends on allowed finger or palm sizes. In some embodiments, the computing device 100 may load a sixteen-by-sixteen square block of cells roughly centered on the centroid.

In block 906, the computing device 100 zeros input cells having a touch data value below the signal threshold. That is, the computing device 100 sets the value of such cells to zero. Zeroing input cells below the input threshold may improve detection performance.

In block 908, the computing device 100 calculates the sum of all edge cells within a window and the maximum value of all edge cells within the window. The computing device 100 may store the sum and the maximum in an array for later retrieval. The initial window may be a three-by-three square window surrounding the centroid. For example, referring to FIG. 8, the initial window may be illustrated by window 804. The sum of the edge cells would thus be the sum of cells $C_1$ through $C_8$. The maximum would be the largest value of cells $C_1$ through $C_8$.

Referring back to FIG. 9, in block 910 the computing device 100 calculates the product of the number of edge cells within the current window and the signal threshold. For example, a three-by-three window includes eight edge cells, a five-by-five window includes sixteen edge cells, and so on. In block 912, the computing device 100 determines whether the sum of the edge cells for the current window is less than the product of the edge cells times the signal threshold. If so, the average value of the edge cells is less than the signal threshold, meaning the cluster boundary has been found. If the sum is less than the number of cells times the signal threshold, the method 900 branches to block 920, described below. If the sum is not less than the number of cells times the signal threshold, the method 900 advances to block 914.

In block 914, the computing device 100 determines whether the maximum value of the current window is less than or equal to the maximum value of the previous window. For the initial window, the computing device 100 determines whether the maximum value of the current window is less than or equal to the value of the centroid. For example, the computing device 100 may determine whether the maximum value of a five-by-five window (the current window) is less than or equal to the maximum value of a three-by-three window (the previous window). If the maximum value of the current window is not less than or equal to the maximum value of the previous window, that is, if the maximum value of the current window is greater than the maximum value of the previous window, then the method 900 branches to block 920, described below. If the maximum value of the current window is less than or equal to the maximum value of the previous window, the method 900 advances to block 916.

In block 916, the computing device 100 increases the window size. Because the maximum of the current window is less than or equal to the maximum of the previous window, every cell of the current window may be included within the centroid boundary. Therefore, the window size may be increased to continue searching for the boundary. In block 918, the computing device 100 determines whether the maximum window size has been exceeded. The maximum window size may be defined based on, for example, the size of the input frame data block loaded in block 904. For example, the maximum window size may be fifteen cells by fifteen cells, the largest window size possible within a sixteen-cell square block of input frame data. If the maximum window size has not been exceeded, the method 900 loops back to block 908 to continue searching for the cluster boundary. If the maximum window size has been exceeded, the method 900 advances to block 920.

In block 920, the computing device 100 counts the number of valid cells in the previous window. At this point, the computing device may have determined that the average value of the edge cells of the current window does not exceed the signal threshold in block 912, that the maximum of the current window exceeds the maximum of the previous window in block 914, or that the maximum window size has been exceeded in block 918. In all of those situations, the previous, smaller window may be used as the cluster boundary. For the initial window, the centroid may be used as the previous window, leading to a single-cell cluster. The computing device 100 may identify all non-zero cells within the selected window as valid cells, because cells below the signal threshold were zeroed in block 906. The computing device 100 may count the edge cells using a SIMD instruction, for example, a SIMD sum instruction.

Figure 10:
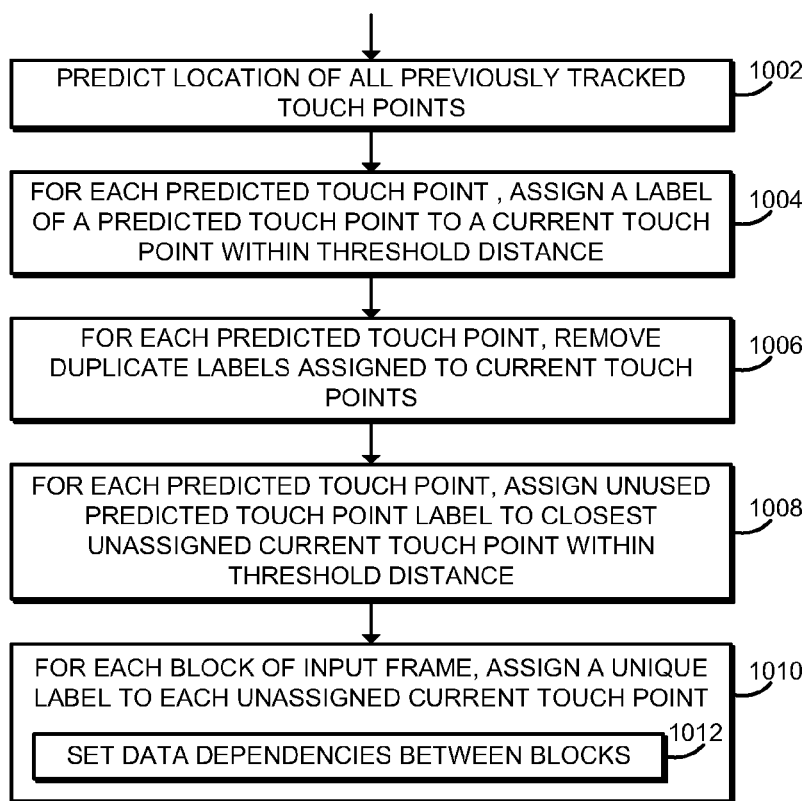
FIG. 10 is a simplified flow diagram of at least one embodiment of a method for tracking touch point positions, which may be executed by the computing device of FIGS. 1 and 2.

Referring now to FIG. 10, in use, the computing device 100 may execute a method 1000 for assigning persistent identifiers to touch points. As described above in connection with block 306 of FIG. 3, upon execution of the method 1000, the computing device 100 may already have received an input frame from the touch screen and performed centroid and cluster boundary detection to identify current touch points in the input frame. The method 1000 begins in block 1002, in which the computing device 100 predicts a location in the current input frame for all previously tracked touch points. Of course, for the first invocation of method 1000, there will be no previously tracked touch points. In some embodiments, the computing device 100 may extrapolate the predicted locations from previous locations, for example by determining a speed of each touch point and predicting a location as a function of the speed. However, in some embodiments, the computing device 100 may simply predict the location of each previously tracked touch point as being the same as in the previous input frame. This simplified approach may be appropriate where touch points are likely to be relatively slow-moving.

In block 1004, for each of the predicted touch points, the computing device 100 assigns an identifier of a predicted touch point to a current touch point located within a tracking distance threshold of the predicted touch point. Each predicted touch point is associated with a unique identifier that may be used to track the location of the touch point between frames. The tracking distance threshold represents the maximum distance on the touch screen 138 that a touch point may move between input frames and be considered the same touch point. The tracking distance threshold may be measured in terms of input frame cells. For example, in some embodiments, the threshold may be seven cells. In some embodiments, the computing device 100 may assign an identifier for each of the predicted touch points in a separate assignment task, and each of these tasks may be dispatched to the processor graphics 124 for execution in parallel. The method for assigning identifiers is described further with respect to FIG. 11, below.

In block 1006, for each of the predicted touch points, the computing device 100 removes any duplicate identifiers assigned to current touch points. Because the method of block 1004 is executed independently for each predicted touch point, the same identifier may be assigned to multiple current touch points. To correct this issue, the computing device 100 removes duplicated identifiers, retaining the identifier on the current touch point closest to the predicted touch point. In some embodiments, the computing device 100 remove duplicate identifiers for each predicted touch point in a separate removal task, and each of these tasks may be dispatched to the processor graphics 124 for execution in parallel. The method for removing duplicate identifiers is described further with respect to FIG. 12, below.

In block 1008, for each predicted touch point, the computing device 100 assigns any unused predicted touch point identifier to the closest unassigned current touch point within the threshold distance. In some embodiments, the computing device 100 may assign unused predicted touch point identifiers for each predicted touch point in a separate assignment task, and each of these tasks may be dispatched to the processor graphics 124 for execution in parallel. The method for assigning unused predicted touch point identifiers is described further with respect to FIG. 13, below.

In block 1010, for each block of the input frame, the computing device 100 assigns a new unique identifier to each unassigned current touch point. As described above, the input frame may be grouped into square blocks of cells. In some embodiments, the blocks may be four-by-four cell squares, and in other embodiments, the blocks may be three-by-three cell squares. In some embodiments, the computing device 100 may dispatch an assignment task for each block on the processor graphics 124 to find and assign an identifier to each unassigned current touch point within the block. For example, the computing device 100 may maintain a global counter and assign increasing integer values as identifiers. The counter may be sufficiently large to allow for a typical number of unique identifiers without rolling over. For example, in some embodiments an unsigned eight-bit integer may be used as the counter, allowing 256 unique identifiers. As another example, to ensure identifiers are unique, the computing device 100 may maintain a map of identifiers and select an unused identifier using the map. The map may be embodied as eight unsigned thirty-two bit integers including a total of 256 bits, with each bit of the map representing whether a particular identifier has been assigned.

In block 1012, the computing device 100 may set data dependencies between the blocks to control the order that the blocks are evaluated. Controlling the order of execution allows the computing device 100 to generate a repeatable set of unique identifiers for the unassigned current touch points. As described above, the data dependencies may be used by the scoreboard 128 of the processor graphics 124 to control execution order. For example, data dependencies may be set to search the blocks columnwise, traversing each column vertically before advancing to the next column. The data dependencies may include the global counter or the map of identifiers discussed above, allowing each block to calculate unique identifiers based on the results of the previous block.

Figure 11:
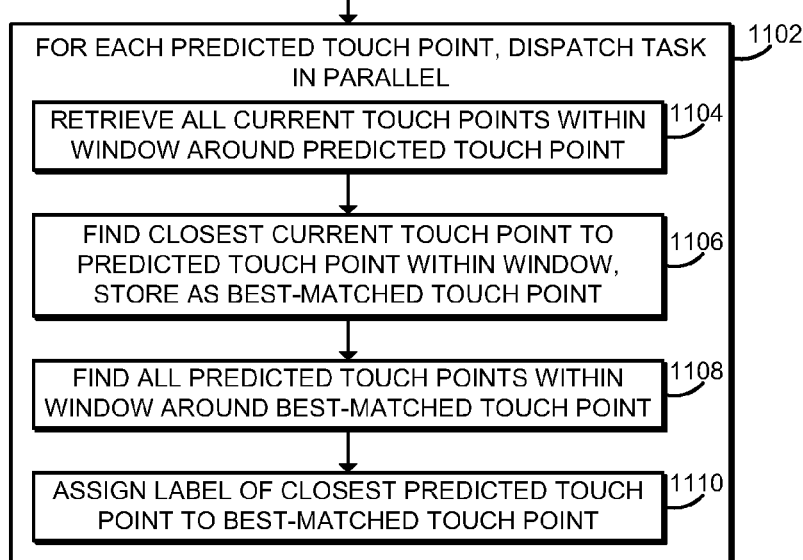
FIG. 11 is a simplified flow diagram of at least one embodiment of a sub-method for assigning touch point identifiers to touch point data in parallel using processor graphics, which may be executed as part of the method of FIG. 10.

Referring now to FIG. 11, in use, the computing device 100 may execute a method 1100 for assigning identifiers to current touch points. The method 1100 begins in block 1102, in which the computing device 100 dispatches a task for each of the predicted touch points in parallel on the processor graphics 124. For each of the tasks, in block 1104, the computing device 100 retrieves all current touch points of the current input frame within a window around the location of the predicted touch point. As described above, the computing device 100 may organize the input frame in memory by grouping the input frame cells into square blocks, for example into four-by-four blocks or three-by-three cell blocks. Such grouping into blocks may be similar to the organization for centroid detection described above in connection with block 502 of FIG. 5. Touch point information for each block may be stored in a format that may be readily loaded, stored, and otherwise manipulated by the processor graphics 124, such as an image or texture format. For example, touch point information for each block may be stored in a thirty-two-bit float two-dimensional surface format. The window is sized to be large enough to include all cells within the tracking distance threshold of the predicted touch point. For example, two four-by-four blocks or three three-by-three blocks are required to cover a seven-cell tracking distance threshold, and the tracking distance threshold may be covered in all directions from the predicted touch point. Thus in some embodiments, for four-by-four cell blocks, the window may be five blocks square, and for three three-by-three blocks, the window may be seven blocks square. The block containing the predicted touch point is positioned at the center of the window.

In block 1106, the computing device 100 finds the closest current touch point to the predicted touch point located within the window. The computing device 100 stores that closest current touch point for later processing as the best-matched touch point.

In block 1108, the computing device 100 finds all predicted touch points within a window around the best-matched touch point identified in block 1106. The window is the same size as the window searched in block 1104. However, because the best-matched touch point may be located in a different block, the computing device 100 may retrieve and search different blocks. In block 1110, the computing device 100 assigns the identifier of the closest predicted touch point to the best-matched touch point. Thus, the best-matched touch point may be assigned an identifier different than that of the predicted touch point originally searched in block 1104. After assigning the identifier, the method 1100 returns.

Figure 12:
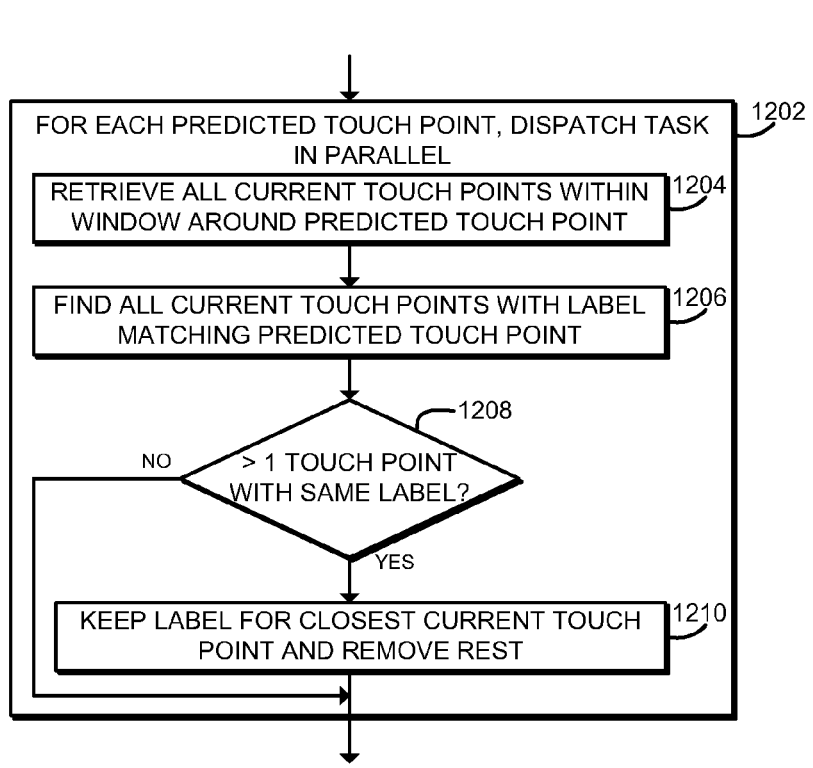
FIG. 12 is a simplified flow diagram of at least one embodiment of a sub-method for removing duplicate touch point identifiers in parallel using processor graphics, which may be executed as part of the method of FIG. 10.

Referring now to FIG. 12, in use, the computing device 100 may execute a method 1200 for removing duplicate identifiers. The method 1200 begins in block 1202, in which the computing device 100 dispatches a task for each of the predicted touch points in parallel on the processor graphics 124. In block 1204, the computing device 100 retrieves all current touch points within a window around the predicted touch point. As described above with respect to block 1104 of FIG. 10, the window is sized to include all blocks containing cells within the tracking distance threshold of the predicted touch point, and may be embodied as a five-by-five block square window or a seven-by-seven block square window, depending on the block size.

In block 1206, the computing device 100 finds all current touch points within the window having an identifier matching the identifier of the predicted touch point. In block 1208, the computing device determines whether more than one current touch point has the same identifier as the predicted touch point. If not, no identifier need be removed and the method 1200 returns. If so, the method 1200 advances to block 1210.

In block 1210, of the current touch points having matching identifiers, the computing device 100 keeps the identifier for the closest current touch point and removes the identifier from the rest. Each current touch point having an identifier removed reverts to its original, unassigned state. Thus, after completing block 1210, all duplicate identifiers have been removed, and the method 1200 returns.

Figure 13:
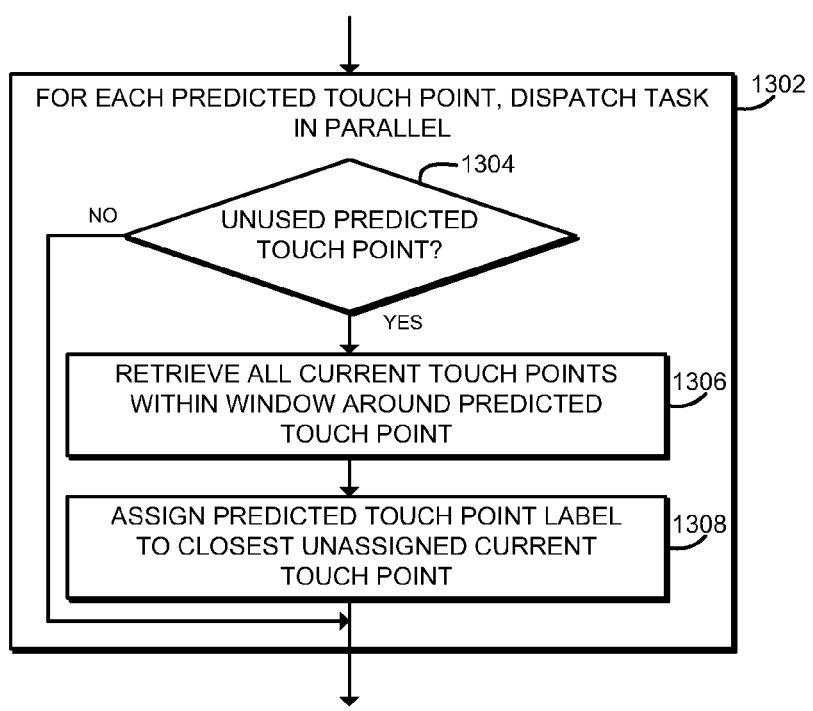
FIG. 13 is a simplified flow diagram of at least one embodiment of a sub-method for assigning unused predicted touch point identifiers in parallel using processor graphics, which may be executed as part of the method of FIG. 10.

Referring now to FIG. 13, in use, the computing device 100 may execute a method 1300 for assigning unused predicted touch point identifiers. The method 1300 begins in block 1302, in which the computing device 100 dispatches a task for each of the predicted touch points in parallel on the processor graphics 124. In block 1304, the computing device 100 determines whether the predicted touch point is unused. That is, the computing device 100 determines whether the identifier of the predicted touch point has been assigned to any current touch point. If the predicted touch point is not unused; that is, if the predicted touch point has been assigned, the method 1300 returns. If the predicted touch point is unused, the method 1300 advances to block 1306.

In block 1306, the computing device 100 retrieves all current touch points within a window around the unused predicted touch point. As described above with respect to block 1104 of FIG. 11, the window is sized to include all blocks containing cells within the tracking distance threshold of the predicted touch point, and may be embodied as a five-by-five block square window or a seven-by-seven block square window, depending on the block size. In block 1308, the computing device 100 assigns the predicted touch point identifier to the closest unassigned current touch point. If no unassigned current touch points may be found within the window, the predicted touch point remains unused. The predicted touch point may be deleted if unused, or may be aged out if unused for some length of time (not illustrated). After completing block 1308, the method 1300 returns.

EXAMPLES

Illustrative examples of the technologies disclosed herein are provided below. An embodiment of the technologies may include any one or more, and any combination of, the examples described below.

Example 1 includes a computing device for touch point centroid detection, the computing device comprising a touch screen; an input frame module to receive an input frame from the touch screen, the input frame defining a plurality of cells, each cell having a touch data value; and a centroid detection module to group the cells of the input frame into a plurality of blocks; search for a local maximum cell within each of the plurality of blocks, the local maximum cell having a touch data value having a predefined relationship with a signal threshold value; identify each of the local maximum cells as a centroid; merge centroids that are located within a touch distance threshold of each other; and detect a cluster boundary around each of the merged centroids, each cluster boundary to include at least one cell of the input frame.

Example 2 includes the subject matter of Example 1, and wherein each of the blocks comprises one of: a four-cell square block of sixteen continuous cells, or a three-cell square block of nine continuous cells.

Example 3 includes the subject matter of any of Examples 1 and 2, and wherein to search for the local maximum cell comprises to search for a local maximum cell having a touch data value greater than or equal to the signal threshold value.

Example 4 includes the subject matter of any of Examples 1-3, and wherein to merge the centroids comprises to traverse the blocks in vertical stripes and merging centroids in neighboring blocks separated vertically by less than the touch distance threshold; traverse the blocks in horizontal stripes and merging centroids in neighboring blocks separated horizontally by less than the touch distance threshold; and traverse the blocks in diagonally adjacent pairs and merging centroids in neighboring blocks separated diagonally by less than the touch distance threshold.

Example 5 includes the subject matter of any of Examples 1-4, and wherein to merge the centroids in neighboring blocks comprises to identify a first centroid and a second centroid of a pair of centroids separated by less than the touch distance threshold, wherein the first centroid includes a first touch data value greater than a second touch data value of the second centroid; and remove the identification as a centroid from the second centroid.

Example 6 includes the subject matter of any of Examples 1-5, and wherein the touch distance threshold comprises two cells.

Example 7 includes the subject matter of any of Examples 1-6, and further including a processor graphics, wherein to traverse the blocks in vertical stripes comprises to dispatch one task per block using the processor graphics, wherein each task comprises to merge a centroid within the block that is located within the touch distance threshold from another centroid located in the neighboring block; and set data dependencies between the tasks using a scoreboard of the processor graphics to traverse the blocks in vertical stripes; wherein to traverse the blocks in horizontal stripes comprises to dispatch one task per block using the processor graphics, wherein each task comprises to merge a centroid within the block that is located within the touch distance threshold from another centroid located in the neighboring block; and set data dependencies between the tasks using the scoreboard of the processor graphics to traverse the blocks in horizontal stripes; and wherein to traverse the blocks in diagonally adjacent pairs comprises to dispatch one task per square group of four blocks using the processor graphics, wherein each task comprises to merge centroids within the square group of blocks that are located within the touch distance threshold from another centroid located in a neighboring block; and set data dependencies between the tasks using the scoreboard of the processor graphics to traverse the blocks in diagonally adjacent pairs.

Example 8 includes the subject matter of any of Examples 1-7, and wherein to detect the cluster boundary around each of the merged centroids comprises to load data from the input frame for cells surrounding the centroid; zero cells including a touch data value less than the signal threshold value; define an input window including cells of the input frame surrounding the cluster boundary; replicate edge cells of the cluster to build a comparison window having a size equal to a size of the input window; subtract a touch data value of each edge cell of the input window from a touch data value of a corresponding replicated edge cell of the comparison window to determine a plurality of edge cell differences; increase the comparison window size in response to a determination that none of the edge cell differences is less than zero; and count a number of valid cells in the input window in response to a determination that any of the edge cell differences is less than zero, each valid cell having a corresponding edge cell difference not less than zero.

Example 9 includes the subject matter of any of Examples 1-8, and wherein to load the input frame data comprises to load data from a sixteen-by-sixteen square of cells surrounding the centroid.

Example 10 includes the subject matter of any of Examples 1-9, and wherein to subtract a touch data value of each edge cell comprises to pack an edge of the input window into a first vector; pack an edge of the comparison window into a second vector; and subtract the first vector from the second vector using a single-instruction-multiple-data subtraction instruction of the processor graphics.

Example 11 includes the subject matter of any of Examples 1-10, and wherein to count the number of valid cells comprises to count the number of valid cells using a single-instruction-multiple-data sum instruction of the processor graphics.

Example 12 includes the subject matter of any of Examples 1-11, and wherein to detect the cluster boundary around each of the merged centroids comprises to load data from the input frame for cells surrounding the centroid; zero cells including a touch data value less than the signal threshold value; calculate a first maximum of edge cells within the first window; calculate a sum of edge cells within a second window of the input frame surrounding the centroid, the second window surrounding the first window; calculate a second maximum of edge cells within the second window; determine whether the sum is less than the number of edge cells within the second window multiplied by the signal threshold; determine whether the second maximum is greater than the first maximum; increase a size of the first window and the second window in response to a determination that the sum is not less than the number of edge cells within the second window multiplied by the signal threshold and a determination that the second maximum is not greater than the first maximum; and count a number of valid cells in the first window in response to a determination that the sum is less than the number of edge cells within the second window multiplied by the signal threshold or a determination that the second maximum is greater than the first maximum.

Example 13 includes the subject matter of any of Examples 1-12, and further including a processor graphics; and a parallel dispatch module; wherein to search for the local maximum cell comprises to assign one search task per block to be executed by the processor graphics; to merge the centroids comprises to assign one merge task per block to be executed by the processor graphics; and to detect the cluster boundary around each of the merged centroids comprises to assign one detection task per merged centroid to be executed by the processor graphics; wherein the parallel dispatch module to (i) execute the search tasks in parallel, (ii) execute the merge tasks in parallel, and (iii) execute the detection tasks in parallel using multiple execution units of the processor graphics.

Example 14 includes the subject matter of any of Examples 1-13, and wherein the centroid detection module to perform at least one of to: search for the local maximum cell, merge centroids, or detect the cluster boundary using a single-instruction-multiple-data instruction of the processor graphics.

Example 15 includes a computing device for touch point tracking, the computing device comprising a touch screen; an input frame module to (i) receive a previous input frame from the touch screen, the previous input frame defining a plurality of cells identifying a plurality of previously tracked touch points and (ii) receive a current input frame from the touch screen, the current input frame defining a plurality of cells and identifying a plurality of current touch points; and a touch point tracking module to predict a location of each of the plurality of previously tracked touch points identified in the previous input frame; assign an identifier of a previously tracked touch point to a current touch point having a current location within a tracking distance threshold of the predicted location of the previously tracked touch point; remove duplicate identifiers assigned to the current touch points; assign each unassigned identifier of the previously tracked touch points to a current touch point (i) that is the closest current touch point to the previously tracked touch point within the tracking distance threshold and (ii) that has not previously been assigned an identifier of the previously tracked touch points; and assign a unique identifier to each unassigned current touch point.

Example 16 includes the subject matter of Example 15, and wherein to predict the location of each of the plurality of previously tracked touch points comprises one of to: (i) determine a location of each of the plurality of previously tracked touch points in the previous input frame, or (ii) determine a speed of each of the plurality of previously tracked touch points and predict the location as a function of the speed.

Example 17 includes the subject matter of any of Examples 15 and 16, and wherein to assign the identifier of the previously tracked touch point to the current touch point comprises to retrieve all current touch points of the input frame located within the tracking distance threshold of the predicted location of the previously tracked touch point; identify a closest current touch point of the retrieved current touch points to the predicted location; retrieve all previously tracked touch points having predicted locations within the tracking distance threshold of the closest current touch point; identify a closest previously tracked touch point of the retrieved previously tracked touch points to the closest current touch point; and assign an identifier of the closest previously tracked touch point to the closest current touch point.

Example 18 includes the subject matter of any of Examples 15-17, and wherein to remove the duplicate identifiers assigned to the current touch point comprises to retrieve all current touch points of the input frame located within the tracking distance threshold of the predicted location of the previously tracked touch point; determine whether more than one of the retrieved current touch points has an identifier matching the identifier of the previously tracked touch point; and in response to a determination that more than one of the retrieved current touch points has an identifier matching the identifier of the previously tracked touch point identify a closest current touch point of the retrieved current touch points having (i) a location closest to the previously tracked touch point and (ii) an identifier matching the identifier of the previously tracked touch point; retain the identifier of the closest current touch point; and remove the identifier of the other current touch points of the retrieved current touch points having an identifier matching the identifier of the previously tracked touch point.

Example 19 includes the subject matter of any of Examples 15-18, and wherein the current input frame comprises a current input frame formatted as image data recognized by a processor graphics of the computing device.

Example 20 includes the subject matter of any of Examples 15-19, and wherein the image data recognized by the processor graphics comprises a thirty-two bit float two-dimensional surface format.

Example 21 includes the subject matter of any of Examples 15-20, and wherein the tracking distance threshold comprises seven input cells of the current input frame.

Example 22 includes the subject matter of any of Examples 15-21, and further including a processor graphics and a parallel dispatch module, wherein to assign the identifier of the previously tracked touch point comprises to assign one assignment task per previously tracked touch point to be executed by the processor graphics; to remove the duplicate identifiers comprises to assign one removal task per previously tracked touch point to be executed by the processor graphics; to assign the identifier of each unused previously tracked touch point comprises to assign one unused identifier assignment task per previously tracked touch point to be executed by the processor graphics; and to assign a unique identifier to each unassigned current touch point comprises to group cells of the current input frame into a plurality of blocks; assign one unique identifier assignment task per block to be executed by the processor graphics; and set data dependencies between the blocks using a scoreboard of the processor graphics; wherein the parallel dispatch module is to execute (i) the assignment tasks in parallel, (ii) the removal tasks in parallel, (iii) the unused identifier assignment tasks in parallel, and (iv) the unique identifier assignment tasks in parallel using multiple execution units of the processor graphics.

Example 23 includes the subject matter of any of Examples 15-22, and wherein the touch point tracking module to perform at least one of to: assign the identifier of the previously tracked touch point, remove duplicate identifiers, assign each unassigned identifier, or assign the unique identifier to each unassigned current touch point using a single-instruction-multiple-data instruction of the processor graphics.

Example 24 includes a method for detecting touch point centroids on a computing device, the method comprising receiving, on the computing device, an input frame from a touch screen of the computing device, the input frame defining a plurality of cells, each cell having a touch data value; grouping, on the computing device, the cells of the input frame into a plurality of blocks; searching, on the computing device, for a local maximum cell within each of the plurality of blocks, the local maximum cell having a touch data value having a predefined relationship with a signal threshold value; identifying, on the computing device, each of the local maximum cells as a centroid; merging, on the computing device, centroids that are located within a touch distance threshold of each other; and detecting, on the computing device, a cluster boundary around each of the merged centroids, each cluster boundary including at least one cell of the input frame.

Example 25 includes the subject matter of Example 24, and wherein grouping the cells comprises one of: grouping sixteen contiguous cells into a four-cell square block, or grouping nine contiguous cells into a three-cell square block.

Example 26 includes the subject matter of any of Examples 24 and 25, and wherein searching for the local maximum cell comprises searching for a local maximum cell having a touch data value greater than or equal to the signal threshold value.

Example 27 includes the subject matter of any of Examples 24-26, and wherein merging the centroids comprises traversing the blocks in vertical stripes and merging centroids in neighboring blocks separated vertically by less than the touch distance threshold; traversing the blocks in horizontal stripes and merging centroids in neighboring blocks separated horizontally by less than the touch distance threshold; and traversing the blocks in diagonally adjacent pairs and merging centroids in neighboring blocks separated diagonally by less than the touch distance threshold.

Example 28 includes the subject matter of any of Examples 24-27, and wherein merging the centroids in neighboring blocks comprises identifying a first centroid and a second centroid of a pair of centroids separated by less than the touch distance threshold, wherein the first centroid includes a first touch data value greater than a second touch data value of the second centroid; and removing the identification as a centroid from the second centroid.

Example 29 includes the subject matter of any of Examples 24-28, and wherein merging the centroids comprises merging centroids in neighboring blocks separated by less than two cells in a direction of traversal.

Example 30 includes the subject matter of any of Examples 24-29, and wherein traversing the blocks in vertical stripes comprises dispatching one task per block using a processor graphics of the computing device, wherein each task comprises merging a centroid within the block that is located within the touch distance threshold from another centroid located in the neighboring block; and setting data dependencies between the tasks using a scoreboard of the processor graphics to traverse the blocks in vertical stripes; traversing the blocks in horizontal stripes comprises dispatching one task per block using the processor graphics, wherein each task comprises merging a centroid within the block that is located within the touch distance threshold from another centroid located in the neighboring block; and setting data dependencies between the tasks using the scoreboard of the processor graphics to traverse the blocks in horizontal stripes; and traversing the blocks in diagonally adjacent pairs comprises dispatching one task per square group of four blocks using the processor graphics, wherein each task comprises merging centroids within the square group of blocks that are located within the touch distance threshold from another centroid located in a neighboring block; and setting data dependencies between the tasks using the scoreboard of the processor graphics to traverse the blocks in diagonally adjacent pairs.

Example 31 includes the subject matter of any of Examples 24-30, and wherein detecting the cluster boundary around each of the merged centroids comprises loading data from the input frame for cells surrounding the centroid; zeroing cells including a touch data value less than the signal threshold value; defining an input window including cells of the input frame surrounding the cluster boundary; replicating edge cells of the cluster to build a comparison window having a size equal to a size of the input window; subtracting a touch data value of each edge cell of the input window from a touch data value of a corresponding replicated edge cell of the comparison window to determine a plurality of edge cell differences; increasing the comparison window size in response to determining that none of the edge cell differences is less than zero; and counting a number of valid cells in the input window in response to determining that any of the edge cell differences is less than zero, each valid cell having a corresponding edge cell difference not less than zero.

Example 32 includes the subject matter of any of Examples 24-31, and wherein loading the input frame data comprises loading data from a sixteen-by-sixteen square of cells surrounding the centroid.

Example 33 includes the subject matter of any of Examples 24-32, and wherein subtracting a touch data value of each edge cell comprises packing an edge of the input window into a first vector; packing an edge of the comparison window into a second vector; and subtracting the first vector from the second vector using a single-instruction-multiple-data subtraction instruction of the processor graphics.

Example 34 includes the subject matter of any of Examples 24-33, and wherein counting the number of valid cells comprises counting the number of valid cells using a single-instruction-multiple-data sum instruction of the processor graphics.

Example 35 includes the subject matter of any of Examples 24-34, and wherein detecting the cluster boundary around each of the merged centroids comprises loading data from the input frame for cells surrounding the centroid; zeroing cells including a touch data value less than the signal threshold value; calculating a first maximum of edge cells within the first window; calculating a sum of edge cells within a second window of the input frame surrounding the centroid, the second window surrounding the first window; calculating a second maximum of edge cells within the second window; determining whether the sum is less than the number of edge cells within the second window multiplied by the signal threshold; determining whether the second maximum is greater than the first maximum; increasing a size of the first window and the second window in response to determining that the sum is not less than the number of edge cells within the second window multiplied by the signal threshold and determining that the second maximum is not greater than the first maximum; and counting a number of valid cells in the first window in response to determining that the sum is less than the number of edge cells within the second window multiplied by the signal threshold or determining that the second maximum is greater than the first maximum.

Example 36 includes the subject matter of any of Examples 24-35, and wherein searching for the local maximum cell comprises assigning one search task per block to be executed by a processor graphics of the computing device; and executing the search tasks in parallel using multiple execution units of the processor graphics; merging the centroids comprises assigning one merge task per block to be executed by the processor graphics; and executing the merge tasks in parallel using multiple execution units of the processor graphics; and detecting the cluster boundary around each of the merged centroids comprises assigning one detection task per merged centroid to be executed by the processor graphics; and executing the detection tasks in parallel using multiple execution units of the processor graphics.

Example 37 includes the subject matter of any of Examples 24-36, and further including performing one of: searching for the local maximum cell, merging centroids, or detecting the cluster boundary using a single-instruction-multiple-data instruction of the processor graphics.

Example 38 includes a method for touch point tracking, the method comprising predicting, on a computing device, a location of each of a plurality of previously tracked touch points identified in a previous input frame received from a touch screen of the computing device, the previous input frame defining a plurality of cells; receiving, on the computing device, a current input frame from the touch screen, the current input frame defining a plurality of cells and identifying a plurality of current touch points; assigning, on the computing device, an identifier of a previously tracked touch point to a current touch point having a current location within a tracking distance threshold of the predicted location of the previously tracked touch point; removing, on the computing device, duplicate identifiers assigned to the current touch points; assigning, on the computing device, each unassigned identifier of the previously tracked touch points to a current touch point (i) that is the closest current touch point to the previously tracked touch point within the tracking distance threshold and (ii) that has not previously been assigned an identifier of the previously tracked touch points; and assigning, on the computing device, a unique identifier to each unassigned current touch point.

Example 39 includes the subject matter of Example 38, and wherein predicting the location of each of the plurality of previously tracked touch points comprises one of: (i) determining a location of each of the plurality of previously tracked touch points in the previous input frame, or (ii) determining a speed of each of the plurality of previously tracked touch points and predicting the location as a function of the speed.

Example 40 includes the subject matter of any of Examples 38 and 39, and wherein assigning the identifier of the previously tracked touch point to the current touch point comprises retrieving all current touch points of the input frame located within the tracking distance threshold of the predicted location of the previously tracked touch point; identifying a closest current touch point of the retrieved current touch points to the predicted location; retrieving all previously tracked touch points having predicted locations within the tracking distance threshold of the closest current touch point; identifying a closest previously tracked touch point of the retrieved previously tracked touch points to the closest current touch point; and assigning an identifier of the closest previously tracked touch point to the closest current touch point.

Example 41 includes the subject matter of any of Examples 38-40, and wherein removing the duplicate identifiers assigned to the current touch point comprises retrieving all current touch points of the input frame located within the tracking distance threshold of the predicted location of the previously tracked touch point; determining whether more than one of the retrieved current touch points has an identifier matching the identifier of the previously tracked touch point; and in response to determining more than one of the retrieved current touch points has an identifier matching the identifier of the previously tracked touch point identifying a closest current touch point of the retrieved current touch points having (i) a location closest to the previously tracked touch point and (ii) an identifier matching the identifier of the previously tracked touch point; retaining the identifier of the closest current touch point; and removing the identifier of the other current touch points of the retrieved current touch points having an identifier matching the identifier of the previously tracked touch point.

Example 42 includes the subject matter of any of Examples 38-41, and wherein receiving the current input frame comprises receiving the current input frame formatted as image data recognized by a processor graphics of the computing device.

Example 43 includes the subject matter of any of Examples 38-42, and wherein receiving the current input frame formatted as image data comprises receiving the current input frame formatted in a thirty-two bit float two-dimensional surface format.

Example 44 includes the subject matter of any of Examples 38-43, and wherein the tracking distance threshold comprises seven input cells of the current input frame.

Example 45 includes the subject matter of any of Examples 38-44, and wherein assigning the identifier of the previously tracked touch point comprises assigning one assignment task per previously tracked touch point to be executed by a processor graphics of the computing device; and executing the assignment tasks in parallel using multiple execution units of the processor graphics; removing the duplicate identifiers comprises assigning one removal task per previously tracked touch point to be executed by the processor graphics; and executing the removal tasks in parallel using multiple execution units of the processor graphics; assigning the identifier of each unused previously tracked touch point comprises assigning one assignment task per previously tracked touch point to be executed by the processor graphics; and executing the assignment tasks in parallel using multiple execution units of the processor graphics; and assigning a unique identifier to each unassigned current touch point comprises grouping cells of the current input frame into a plurality of blocks; assigning one assignment task per block to be executed by the processor graphics; setting data dependencies between the blocks using a scoreboard of the processor graphics; and executing the assignment tasks in parallel using multiple execution units of the processor graphics.

Example 46 includes the subject matter of any of Examples 38-45, and further including performing at least one of: assigning the identifier of the previously tracked touch point, removing duplicate identifiers, assigning each unassigned identifier, or assigning the unique identifier to each unassigned current touch point using a single-instruction-multiple-data instruction of the processor graphics.

Example 47 includes a computing device comprising a processor; and a memory having stored therein a plurality of instructions that when executed by the processor cause the computing device to perform the method of any of Examples 24-46.

Example 48 includes one or more machine-readable storage media comprising a plurality of instructions stored thereon that in response to being executed result in a computing device performing the method of any of Examples 24-46.

Example 49 includes a computing device for touch point centroid detection, the computing device comprising means for performing the method of any of Examples 24-46.

The invention claimed is:

1. A computing device for touch point centroid detection, the computing device comprising:
   a processor graphics;
   a touch screen;
   an input frame module to receive an input frame from the touch screen, the input frame defining a plurality of cells, each cell having a touch data value;
   a centroid detection module to:
      group the cells of the input frame into a plurality of blocks, wherein each block includes a predetermined number of cells;
      search for a local maximum cell within each of the plurality of blocks, the local maximum cell having a touch data value having a predefined relationship with a signal threshold value, wherein to search for the local maximum cell comprises to assign one search task per block to be executed by the processor graphics;
      identify each of the local maximum cells as a centroid;
      merge centroids that are located within a touch distance threshold of each other, wherein to merge the centroids comprises to select a merged centroid from two or more centroids that are located within the touch distance threshold of each other, and wherein to merge the centroids comprises to assign one merge task per block to be executed by the processor graphics; and
      detect a cluster boundary around each of the merged centroids, each cluster boundary to include at least one cell of the input frame, wherein to detect the cluster boundary around each of the merged centroids comprises to assign one detection task per merged centroid to be executed by the processor graphics; and
   a parallel dispatch module to (i) execute the search tasks in parallel, (ii) execute the merge tasks in parallel, and (iii) execute the detection tasks in parallel using multiple execution units of the processor graphics.

2. The computing device of claim 1, wherein to merge the centroids comprises to:
   traverse the blocks in vertical stripes and merging centroids in neighboring blocks separated vertically by less than the touch distance threshold;
   traverse the blocks in horizontal stripes and merging centroids in neighboring blocks separated horizontally by less than the touch distance threshold; and
   traverse the blocks in diagonally adjacent pairs and merging centroids in neighboring blocks separated diagonally by less than the touch distance threshold.

3. The computing device of claim 2, wherein to:
   traverse the blocks in vertical stripes comprises to:
      dispatch one task per block using the processor graphics, wherein each task comprises to merge a centroid within the block that is located within the touch distance threshold from another centroid located in the neighboring block; and
      set data dependencies between the tasks using a scoreboard of the processor graphics to traverse the blocks in vertical stripes;
   traverse the blocks in horizontal stripes comprises to:
      dispatch one task per block using the processor graphics, wherein each task comprises to merge a centroid within the block that is located within the touch distance threshold from another centroid located in the neighboring block; and
      set data dependencies between the tasks using the scoreboard of the processor graphics to traverse the blocks in horizontal stripes; and
   traverse the blocks in diagonally adjacent pairs comprises to:
      dispatch one task per square group of four blocks using the processor graphics, wherein each task comprises to merge centroids within the square group of blocks that are located within the touch distance threshold from another centroid located in a neighboring block; and
      set data dependencies between the tasks using the scoreboard of the processor graphics to traverse the blocks in diagonally adjacent pairs.

4. The computing device of claim 1, wherein to detect the cluster boundary around each of the merged centroids comprises to:
   load data from the input frame for cells surrounding the centroid;
   zero cells including a touch data value less than the signal threshold value;
   define an input window including cells of the input frame surrounding the cluster boundary;
   replicate edge cells of the cluster to build a comparison window having a size equal to a size of the input window;

subtract a touch data value of each edge cell of the input window from a touch data value of a corresponding replicated edge cell of the comparison window to determine a plurality of edge cell differences;

increase the comparison window size in response to a determination that none of the edge cell differences is less than zero; and count a number of valid cells in the input window in response to a determination that any of the edge cell differences is less than zero, each valid cell having a corresponding edge cell difference not less than zero.

5. The computing device of claim 1, wherein to detect the cluster boundary around each of the merged centroids comprises to:

load data from the input frame for cells surrounding the centroid;

zero cells including a touch data value less than the signal threshold value;

calculate a first maximum of edge cells within the first window;

calculate a sum of edge cells within a second window of the input frame surrounding the centroid, the second window surrounding the first window;

calculate a second maximum of edge cells within the second window;

determine whether the sum is less than the number of edge cells within the second window multiplied by the signal threshold;

determine whether the second maximum is greater than the first maximum;

increase a size of the first window and the second window in response to a determination that the sum is not less than the number of edge cells within the second window multiplied by the signal threshold and a determination that the second maximum is not greater than the first maximum; and count a number of valid cells in the first window in response to a determination that the sum is less than the number of edge cells within the second window multiplied by the signal threshold or a determination that the second maximum is greater than the first maximum.

6. The computing device of claim 1, wherein the centroid detection module is to perform at least one of to: search for the local maximum cell, merge centroids, or detect the cluster boundary using a single-instruction-multiple-data instruction of the processor graphics.

7. A method for detecting touch point centroids on a computing device, the method comprising:

receiving, on the computing device, an input frame from a touch screen of the computing device, the input frame defining a plurality of cells, each cell having a touch data value;

grouping, on the computing device, the cells of the input frame into a plurality of blocks, wherein each block includes a predetermined number of cells;

searching, on the computing device, for a local maximum cell within each of the plurality of blocks, the local maximum cell having a touch data value having a predefined relationship with a signal threshold value, wherein searching for the local maximum cell comprises assigning one search task per block to be executed by a processor graphics of the computing device and executing the search tasks in parallel using multiple execution units of the processor graphics;

identifying, on the computing device, each of the local maximum cells as a centroid;

merging, on the computing device, centroids that are located within a touch distance threshold of each other, wherein merging the centroids comprises selecting a merged centroid from two or more centroids that are located within the touch distance threshold of each other, and wherein merging the centroids comprises assigning one merge task per block to be executed by the processor graphics and executing the merge tasks in parallel using multiple execution units of the processor graphics; and detecting, on the computing device, a cluster boundary around each of the merged centroids, each cluster boundary including at least one cell of the input frame, wherein detecting the cluster boundary around each of the merged centroids comprises assigning one detection task per merged centroid to be executed by the processor graphics and executing the detection tasks in parallel using multiple execution units of the processor graphics.

8. The method of claim 7, wherein merging the centroids comprises:

traversing the blocks in vertical stripes and merging centroids in neighboring blocks separated vertically by less than the touch distance threshold;

traversing the blocks in horizontal stripes and merging centroids in neighboring blocks separated horizontally by less than the touch distance threshold; and traversing the blocks in diagonally adjacent pairs and merging centroids in neighboring blocks separated diagonally by less than the touch distance threshold.

9. The method of claim 7, wherein detecting the cluster boundary around each of the merged centroids comprises:

loading data from the input frame for cells surrounding the centroid;

zeroing cells including a touch data value less than the signal threshold value;

defining an input window including cells of the input frame surrounding the cluster boundary;

replicating edge cells of the cluster to build a comparison window having a size equal to a size of the input window;

subtracting a touch data value of each edge cell of the input window from a touch data value of a corresponding replicated edge cell of the comparison window to determine a plurality of edge cell differences;

increasing the comparison window size in response to determining that none of the edge cell differences is less than zero; and counting a number of valid cells in the input window in response to determining that any of the edge cell differences is less than zero, each valid cell having a corresponding edge cell difference not less than zero.

10. The method of claim 7, wherein detecting the cluster boundary around each of the merged centroids comprises:

loading data from the input frame for cells surrounding the centroid;

zeroing cells including a touch data value less than the signal threshold value;

calculating a first maximum of edge cells within the first window;

calculating a sum of edge cells within a second window of the input frame surrounding the centroid, the second window surrounding the first window;

calculating a second maximum of edge cells within the second window;

determining whether the sum is less than the number of edge cells within the second window multiplied by the signal threshold;

determining whether the second maximum is greater than the first maximum;

increasing a size of the first window and the second window in response to determining that the sum is not less than the number of edge cells within the second window multiplied by the signal threshold and determining that the second maximum is not greater than the first maximum; and counting a number of valid cells in the first window in response to determining that the sum is less than the number of edge cells within the second window multiplied by the signal threshold or determining that the second maximum is greater than the first maximum.

11. One or more non-transitory, machine readable storage media comprising a plurality of instructions that in response to being executed cause a computing device to:

receive an input frame from a touch screen of the computing device, the input frame defining a plurality of cells, each cell having a touch data value, wherein each block includes a predetermined number of cells;

group the cells of the input frame into a plurality of blocks;

search for a local maximum cell within each of the plurality of blocks, the local maximum cell having a touch data value having a predefined relationship with a signal threshold value, wherein to search for the local maximum cell comprises to assign one search task per block to be executed by a processor graphics of the computing device;

identify each of the local maximum cells as a centroid;

merge centroids that are located within a touch distance threshold of each other, wherein to merge the centroids comprises to select a merged centroid from two or more centroids that are located within the touch distance threshold of each other, and wherein to merge the centroids comprises to assign one merge task per block to be executed by the processor graphics;

detect a cluster boundary around each of the merged centroids, each cluster boundary including at least one cell of the input frame, wherein to detect the cluster boundary around each of the merged centroids comprises to assign one detection task per merged centroid to be executed by the processor graphics; and execute (i) the search tasks in parallel, (ii) the merge tasks in parallel, and (iii) the detection tasks in parallel using multiple execution units of the processor graphics.

12. The non-transitory, machine readable media of claim 11, wherein to merge the centroids comprises to:

traverse the blocks in vertical stripes and merge centroids in neighboring blocks separated vertically by less than the touch distance threshold;

traverse the blocks in horizontal stripes and merge centroids in neighboring blocks separated horizontally by less than the touch distance threshold; and traverse the blocks in diagonally adjacent pairs and merge centroids in neighboring blocks separated diagonally by less than the touch distance threshold.

13. The non-transitory, machine readable media of claim 12, wherein:

to traverse the blocks in vertical stripes comprises to:

dispatch one task per block using the processor graphics, wherein each task comprises a plurality of instructions that in response to being executed cause the computing device to merge a centroid within the block that is located within the touch distance threshold from another centroid located in the neighboring block; and set data dependencies between the tasks using a scoreboard of the processor graphics to traverse the blocks in vertical stripes;

to traverse the blocks in horizontal stripes comprises to:

dispatch one task per block using the processor graphics, wherein each task comprises a plurality of instructions that in response to being executed cause the computing device to merge a centroid within the block that is located within the touch distance threshold from another centroid located in the neighboring block; and set data dependencies between the tasks using the scoreboard of the processor graphics to traverse the blocks in horizontal stripes; and to traverse the blocks in diagonally adjacent pairs comprises to:

dispatch one task per square group of four blocks using a processor graphics of the computing device, wherein each task comprises a plurality of instructions that in response to being executed cause the computing device to merge centroids within the square group of blocks that are located within the touch distance threshold from another centroid located in a neighboring block; and set data dependencies between the tasks using a scoreboard of the processor graphics to traverse the blocks in diagonally adjacent pairs.

14. The non-transitory, machine readable media of claim 11, wherein to detect the cluster boundary around each of the merged centroids comprises to:

load data from the input frame for cells surrounding the centroid;

zero cells including a touch data value less than the signal threshold value;

define an input window including cells of the input frame surrounding the cluster boundary;

replicate edge cells of the cluster to build a comparison window having a size equal to a size of the input window;

subtract a touch data value of each edge cell of the input window from a touch data value of a corresponding replicated edge cell of the comparison window to determine a plurality of edge cell differences;

increase the comparison window size in response to determining that none of the edge cell differences is less than zero; and count a number of valid cells in the input window in response to determining that any of the edge cell differences is less than zero, each valid cell having a corresponding edge cell difference not less than zero.

15. The non-transitory, machine readable media of claim 11, wherein to detect the cluster boundary around each of the merged centroids comprises to:

load data from the input frame for cells surrounding the centroid;

zero cells including a touch data value less than the signal threshold value;

calculate a first maximum of edge cells within the first window;

calculate a sum of edge cells within a second window of the input frame surrounding the centroid, the second window surrounding the first window;

calculate a second maximum of edge cells within the second window;

determine whether the sum is less than the number of edge cells within the second window multiplied by the signal threshold;

determine whether the second maximum is greater than the first maximum;

increase a size of the first window and the second window in response to determining that the sum is not less than the number of edge cells within the second window multiplied by the signal threshold and determining that the second maximum is not greater than the first maximum; and count a number of valid cells in the first window in response to determining that the sum is less than the number of edge cells within the second window multiplied by the signal threshold or determining that the second maximum is greater than the first maximum.

16. The non-transitory, machine readable media of claim 11, wherein the plurality of instructions comprises a single-instruction-multiple-data instruction of the processor graphics.

17. A computing device for touch point tracking, the computing device comprising:

a touch screen;
a processor graphics;
an input frame module to (i) receive a previous input frame from the touch screen, the previous input frame defining a plurality of cells identifying a plurality of previously tracked touch points and (ii) receive a current input frame from the touch screen, the current input frame defining a plurality of cells and identifying a plurality of current touch points;

a touch point tracking module to:
predict a location of each of the plurality of previously tracked touch points identified in the previous input frame;

assign an identifier of a previously tracked touch point to a current touch point having a current location within a tracking distance threshold of the predicted location of the previously tracked touch point, wherein to assign the identifier of the previously tracked touch point comprises to assign one assignment task per previously tracked touch point to be executed by the processor graphics;

remove duplicate identifiers assigned to the current touch points, wherein to remove the duplicate identifiers comprises to assign one removal task per previously tracked touch point to be executed by the processor graphics;

assign each unassigned identifier of the previously tracked touch points to a current touch point (i) that is the closest current touch point to the previously tracked touch point within the tracking distance threshold and (ii) that has not previously been assigned an identifier of the previously tracked touch points, wherein to assign each unassigned identifier comprises to assign one unused identifier assignment task per previously tracked touch point to be executed by the processor graphics; and assign a unique identifier to each unassigned current touch point, wherein to assign a unique identifier to each unassigned current touch point comprises to group cells of the current input frame into a plurality of blocks, assign one unique identifier assignment task per block to be executed by the processor graphics, and set data dependencies between the blocks using a scoreboard of the processor graphics; and parallel dispatch module is to execute (i) the assignment tasks in parallel, (ii) the removal tasks in parallel, (iii) the unused identifier assignment tasks in parallel, and (iv) the unique identifier assignment tasks in parallel using multiple execution units of the processor graphics.

18. The computing device of claim 17, wherein to assign the identifier of the previously tracked touch point to the current touch point comprises to:

retrieve all current touch points of the input frame located within the tracking distance threshold of the predicted location of the previously tracked touch point;

identify a closest current touch point of the retrieved current touch points to the predicted location;

retrieve all previously tracked touch points having predicted locations within the tracking distance threshold of the closest current touch point;

identify a closest previously tracked touch point of the retrieved previously tracked touch points to the closest current touch point; and assign an identifier of the closest previously tracked touch point to the closest current touch point.

19. The computing device of claim 17, wherein to remove the duplicate identifiers assigned to the current touch point comprises to:

retrieve all current touch points of the input frame located within the tracking distance threshold of the predicted location of the previously tracked touch point;

determine whether more than one of the retrieved current touch points has an identifier matching the identifier of the previously tracked touch point; and in response to a determination that more than one of the retrieved current touch points has an identifier matching the identifier of the previously tracked touch point:

identify a closest current touch point of the retrieved current touch points having (i) a location closest to the previously tracked touch point and (ii) an identifier matching the identifier of the previously tracked touch point;

retain the identifier of the closest current touch point; and remove the identifier of the other current touch points of the retrieved current touch points having an identifier matching the identifier of the previously tracked touch point.

20. The computing device of claim 17, wherein the current input frame comprises a current input frame formatted as image data recognized by a processor graphics of the computing device.

21. The computing device of claim 17, wherein the touch point tracking module to perform at least one of to: assign the identifier of the previously tracked touch point, remove duplicate identifiers, assign each unassigned identifier, or assign the unique identifier to each unassigned current touch point using a single-instruction-multiple-data instruction of the processor graphics.

* * * * *